US011327875B2

(12) United States Patent
Poulin

(10) Patent No.: US 11,327,875 B2
(45) Date of Patent: *May 10, 2022

(54) SYSTEMS INCLUDING NETWORK SIMULATION FOR MOBILE APPLICATION DEVELOPMENT

(71) Applicant: WAPP TECH CORP., Red Deer (CA)

(72) Inventor: Donavan Paul Poulin, Kelowna (CA)

(73) Assignee: WAPP TECH CORP., Alberta (CA)

( * ) Notice: Subject to any disclaimer, the term of this patent is extended or adjusted under 35 U.S.C. 154(b) by 89 days.

This patent is subject to a terminal disclaimer.

(21) Appl. No.: 16/510,928

(22) Filed: Jul. 14, 2019

(65) Prior Publication Data
US 2020/0012592 A1 Jan. 9, 2020

Related U.S. Application Data

(63) Continuation of application No. 15/979,330, filed on May 14, 2018, now Pat. No. 10,353,811, which is a continuation of application No. 14/581,475, filed on Dec. 23, 2014, now Pat. No. 9,971,678, which is a continuation of application No. 13/673,692, filed on
(Continued)

(51) Int. Cl.
G06F 11/36 (2006.01)
G06F 11/34 (2006.01)
G06F 30/20 (2020.01)
G06Q 20/14 (2012.01)

(52) U.S. Cl.
CPC ...... *G06F 11/3688* (2013.01); *G06F 11/3457* (2013.01); *G06F 30/20* (2020.01); *G06Q 20/145* (2013.01); *G06F 2201/86* (2013.01)

(58) Field of Classification Search
CPC ............ G06F 11/3688; G06F 11/3457; G06F 2201/86; G06Q 20/145
See application file for complete search history.

(56) References Cited

U.S. PATENT DOCUMENTS 5,892,794 A 4/1999 Slegers
5,937,421 A 8/1999 Petrov et al.
(Continued)

FOREIGN PATENT DOCUMENTS

GB 2398456 8/2004
GB 2398457 8/2004
(Continued)

OTHER PUBLICATIONS

"A Million Users in a Box: The WTS Story," Mobile Systems Verification Corporation, Date Unknown, 13 pages.
(Continued)

*Primary Examiner* — Thai Q Phan
(74) *Attorney, Agent, or Firm* — Innovation Capital Law Group, LLP; Vic Lin

(57) ABSTRACT

A system and methods to emulate an application executing in real time in a mobile device. The mobile device is emulated in real time using a model running on a processor extrinsic to the mobile device. The model is based on characteristics indicative of performance of the mobile device. The application is executed in real time within the model and the application executing in the model is monitored to determine resource utilization information by the application for the mobile device. The resource utilization information for the mobile device is displayed.

32 Claims, 14 Drawing Sheets

Related U.S. Application Data

Nov. 9, 2012, now Pat. No. 8,924,192, which is a continuation of application No. 12/759,543, filed on Apr. 13, 2010, now Pat. No. 8,332,203, which is a continuation of application No. 11/449,958, filed on Jun. 9, 2006, now Pat. No. 7,813,910.

(60) Provisional application No. 60/689,101, filed on Jun. 10, 2005.

(56) References Cited

U.S. PATENT DOCUMENTS

| | | | |
|---|---|---|---|
| 6,389,384 B1 | 5/2002 | Hampshire et al. |
| 6,393,437 B1 | 5/2002 | Zinda et al. |
| 6,467,052 B1 | 10/2002 | Kaler et al. |
| 6,477,483 B1 | 11/2002 | Scarlat et al. |
| 6,560,564 B2 | 5/2003 | Scarlat et al. |
| 6,708,293 B2 | 3/2004 | Kaler et al. |
| 6,802,058 B2 | 10/2004 | Banavar et al. |
| 7,047,176 B2 | 5/2006 | Klevans et al. |
| 7,107,049 B2 | 9/2006 | Baberis et al. |
| 7,313,772 B2 | 12/2007 | Hekmatpour et al. |
| 7,339,891 B2 | 3/2008 | Binder et al. |
| 7,508,868 B2 | 3/2009 | Chang |
| 7,529,990 B2 | 5/2009 | Haggerty |
| 7,546,298 B2 | 6/2009 | Poulin |
| 7,613,453 B2 | 11/2009 | Hassan et al. |
| 7,647,399 B2 | 1/2010 | Ofel |
| 7,673,042 B2 | 3/2010 | Lesser |
| 7,757,207 B2 | 7/2010 | Yan et al. |
| 7,783,463 B2 | 8/2010 | Herro |
| 7,813,910 B1 | 10/2010 | Poulin |
| 7,877,230 B2 | 1/2011 | Ofel et al. |
| 7,877,247 B2 | 1/2011 | Nahata et al. |
| 8,086,904 B2 | 12/2011 | Goldstein et al. |
| 8,108,201 B2 | 1/2012 | Ragnunath et al. |
| 8,116,179 B2 | 2/2012 | Lewallen et al. |
| 8,255,876 B2 | 8/2012 | Drukman et al. |
| 8,332,203 B1 | 12/2012 | Poulin |
| 8,738,761 B2 | 5/2014 | Raisoni et al. |
| 8,924,192 B1 | 12/2014 | Poulin |
| 9,158,518 B2 | 10/2015 | Brown et al. |
| 9,298,864 B2 | 3/2016 | Poulin |
| 9,971,678 B2 | 5/2018 | Poulin |
| 10,353,811 B2 | 7/2019 | Poulin |
| 2001/0041973 A1 | 11/2001 | Abkowitz |
| 2002/0015387 A1 | 2/2002 | Houh |
| 2002/0059054 A1 | 5/2002 | Bade et al. |
| 2002/0077823 A1 | 6/2002 | Fox et al. |
| 2002/0169591 A1 | 11/2002 | Ryzl |
| 2002/0188713 A1 | 12/2002 | Bloch et al. |
| 2003/0045298 A1 | 3/2003 | Linton et al. |
| 2003/0139180 A1 | 7/2003 | McIntosh et al. |
| 2003/0156549 A1 | 8/2003 | Binder et al. |
| 2003/0163382 A1 | 8/2003 | Stefanik et al. |
| 2003/0236657 A1 | 12/2003 | Ryzl |
| 2004/0039975 A1 | 2/2004 | Kounik et al. |
| 2004/0040010 A1 | 2/2004 | Kounik et al. |
| 2004/0059562 A1 | 3/2004 | Bergman et al. |
| 2004/0097237 A1 | 5/2004 | Aoyama |
| 2004/0122645 A1 | 6/2004 | Shevenell et al. |
| 2004/0128585 A1 | 7/2004 | Hind et al. |
| 2004/0154016 A1 | 8/2004 | Randall |
| 2005/0090239 A1 | 4/2005 | Lee et al. |
| 2005/0090243 A1 | 4/2005 | El Husseini et al. |
| 2005/0125211 A1 | 6/2005 | Nahata et al. |
| 2005/0182611 A1 | 8/2005 | Sakamoto |
| 2006/0009157 A1 | 1/2006 | Chiu |
| 2006/0036941 A1 | 2/2006 | Neil |
| 2006/0037002 A1 | 2/2006 | Vinberg |
| 2006/0041858 A1 | 2/2006 | Yan et al. |
| 2006/0090136 A1 | 4/2006 | Miller et al. |
| 2006/0136191 A1 | 6/2006 | Irons |
| 2006/0140125 A1 | 6/2006 | Ottinger et al. |
| 2006/0205398 A1 | 9/2006 | Seckendorf et al. |
| 2006/0223522 A1 | 10/2006 | Guo et al. |
| 2006/0239198 A1 | 10/2006 | Mlinarsky et al. |
| 2006/0277231 A1 | 12/2006 | Kral et al. |
| 2006/0282247 A1 | 12/2006 | Brennan et al. |
| 2007/0002753 A1 | 1/2007 | Bailey |
| 2007/0005324 A1 | 1/2007 | Gong et al. |
| 2007/0019769 A1 | 1/2007 | Green et al. |
| 2007/0127426 A1 | 6/2007 | Watters et al. |
| 2007/0142091 A1 | 6/2007 | Gasborro et al. |
| 2007/0174490 A1 | 7/2007 | Choi et al. |
| 2007/0288424 A1 | 12/2007 | Nell |
| 2008/0313282 A1 | 12/2008 | Warila et al. |
| 2009/0157811 A1 | 6/2009 | Bailor et al. |
| 2009/0254330 A1 | 10/2009 | Goria |
| 2010/0017185 A1 | 1/2010 | Bade et al. |
| 2010/0075678 A1 | 3/2010 | Akman et al. |
| 2012/0129503 A1 | 5/2012 | Lindeman et al. |
| 2016/0314060 A1 | 10/2016 | Poulin |

FOREIGN PATENT DOCUMENTS

| | | |
|---|---|---|
| WO | WO 99/63439 | 12/1999 |
| WO | WO 2005/053341 | 6/2005 |
| WO | WO 2006/089386 | 8/2006 |

OTHER PUBLICATIONS

"About Mobile Systems Verification," Mobile Systems Verification Corporation, Feb. 11, 2002, 1 page.
"About MTS Tester Edition," mVerify Corporation, 2007, 2 pages.
"AppTest," Digia, Inc., 2003, retrieved from https://web.archive.org/web/20030610173449/http://digia.com:80/digia/devhome.nsf/pages/AppTest, 2 pages.
"Function: Getramfree()," Qualcommm Technologies Inc., 2010, retrieved from https://developer.brewmp.com/reference/api/brew-mp-102/function-getramfree, 2 pages.
"Gate II/Mate Overview," Ericsson Radio Systems, Date Unknown, 34 pages.
"Hotwire.com Selects Shunra Software to Proactively Ensure the Performance of its eCommerce Applications Over the internet," Shunra Software Ltd., Nov, 8, 2004, retrieved from https://web.archive.org/web/20050405232409/http://www.shunra.com/newsroom/release/releaseDetail.php?r=38, 2 pages.
"How Shunra\Storm Works," Shunra Software Ltd., 2004, retrieved from https://web.archive.org/web/20040428035846/http://www.shunra.com:80/products/storm/storm_sub/storm_2.php, 3 pages.
"Iheap_Getmemstats()," Qualcommm Technologies Inc., 2010, retrieved from https://deveoper.brewmp.com/reference/api/brew-mp-102/iheapgetmemstats, 2 pages.
"Ishell_Getdeviceinfo()," Qualcomm Technologies Inc., 2010, retrieved from https://deveoper.brewmp.com/reference/api/brew-mp-102/ishellgetdeviceinfo, 2 pages.
"Launch Configuration Settings," EclipseME, 2005, retrieved from https://web.archive.org/web/20050225034344/http://eclipseme.org/docs/refLaunchConfig.html, 4 pages.
"LG200 3G Load Generator," UbiNetics, 2002, retrieved from https://web.archive.org/web/20040224010205/http://www.ubinetics.com:80/product/product.asp?tab=1&intld=14&s=S, 3 pages.
"MATE User Manual," Ericsson Radio Systems, 2001, 13 pages.
"Mercury LoadRunner—Features and Benefits," Mercury Interactive Corporation, 2004, retrieved from https://web.archive.org/web/20040529014436/http://www.mercury.com:80/us/products/performance-center/ioadrunner/features.html, 1 page.
"Mercury LoadRunner—How It Works," Mercury Interactive Corporation, 2004, retrieved from https://web.archive.org/web/20040615191333/http://www.mercury.com/us/products/performance-center/loadrunner/works.html, 1 page.
"MTS Road Map," mVerify Corporation, Sep. 8, 2006, 7 pages.
"MTS/LGS Logistics Solution," mVerify Corporation, 2006, 1 page.
"MVerify Solutions," mVerify Corporation, 2008, 3 pages.
"Nokia Developer's Suite for the Java 2 Platform, Micro Edition, Version 3.0 for Windows, User's Guide," Apr. 26, 2005, 105 pages.

(56) References Cited

OTHER PUBLICATIONS

"NXM Airlink Emulator," mVerify Corporation, Oct. 3, 2003, 5 pages.
"PacketStorm1800E/2600E IP Network Emulator," PacketStorm, Web Archive Dated Jun. 13, 2001, retrieved from https://web.archive.org/web/20010613092608/http:/www.packetstorm.com:80/PacketStorm1800E.pdf, 39 pages.
"Products: Mercury LoadRunner for Automated Load Testing," Mercury Interactive Corporation, 2004, retrieved from https://web.archive.org/web/20040529014849/http://www.mercury.com/us/products/performance-center/loadrunner/, 1 page.
"Shunra Software delivers pre-emptive Infrastructure Performance Management," Shunra Software Ltd., 2004, retrieved from https://web.archive.org/web/20040815083936/http://www.shunra.com/products/cloud/image_cloud1.php, 1 page.
"Shunra Stratus 2.0 Shortens Development Lifecycle," International Developer, Jul. 5, 2004, retrieved from https://web.archive.org/web/20040625071924/http://www.intldeveloper.co.uk/news/general+news/shunra+stratus+2.0+shortens+development+lifecycl, 2 pages.
"Shunra Stratus 2.0 Shortens Development Lifecycle," International Developer, Jul. 5, 2004, retrieved from https://web.archive.org/web/20040S25071924/http://www.intldeveloper.co.uk/news/general+news/shunra+stratus+2.0+shortens+development+lifecycl, 2 pages.
"Shunra Virtual Enterprise 4.0—Deliver It with Confidence," Shunra Software Ltd., 2006, 6 pages.
"Shunra\Cloud; Network Emulator for the Small Business Performance Lab," Shunra Software Ltd., 2004, retrieved from https://web.archive.org/web/20040603034347/http://www.shunra.com/products/cloud/cloud_1.php, 2 pages.
"Shunra\Storm Solution Suite: The Complete Enterprise Performance Lab," Shunra Software Ltd., 2004, retrieved from https://web.archive.org/web/20040220110254/http://www.shunra.com:80/products/storm/storm_1.php, 4 pages.
"Shunra\Storm: Bringing the Complete Enterprise Environment into Your Lab," Shunra Software Ltd., 2003, 7 pages.
"Shunra\Stratus 2.0 for Development Testing of Distributed Applications," Shunra Software Ltd., 2004, retrieved from https://web.archive.org/web/20040609052906/http://www.shunra.com/products/stratus/stratus_1.php, 3 pages.
"Shunra\Stratus: Performance Debugger for Distributed Applications," Shunra Software Ltd., 2004, retrieved from https://web.archive.org/web/20040405013310/http://www.shunra.com:80/products/stratus/stratus_1.php, 3 pages.
"Technology Briefing: Testing Complex Networks, Prepared for Lockheed-Martin," mVerify Corporation, Feb. 28, 2008, 25 pages.
"Testing Report; Shunra\Storm STX-100," CT Labs Testing Services, Oct. 2003, 9 pages.
"The Shunra Virtual Enterprise Architecture and Specifications," Shunra Software Ltd,, 2004, retrieved from https://web.archive.org/web/20050403171105/http://www.shunra.com/products/Architecture.php, 4 pages.
"The Shunra Virtual Network (Desktop Edition)," Shunra Software Ltd., 2004, retrieved from https://web.archive.org/web/20050205135902/http://www.shunra.com/products/VirtualNetworkDesktop.php, 3 pages.
"The Shunra Virtual Network: Assess IT Services Over a Network Link," Shunra Software Ltd., Web Archive dated Mar. 7, 2005, 2 pages.
"Using the Brew MP 1.0.2 API Reference," Brew, 2019, retrieved from brewmp.com, 3932 pages. Submitted in Seven Parts.
"*Wapp Tech Limited Partnership and Wapp Tech Corp.*, v. *Bank of America Corp.*, Defendant's P.R. 3-3 Invalidity Contentions," United States District Court for the Eastern District of Texas, Sherman Division, Dec. 20, 2019, 43 pages.
"*Wapp Tech Limited Partnership and Wapp Tech Corp.*, v. *Bank of America Corp.*, Defendant's P.R. 3-3 Invalidity Contentions: Appendix A," United States District Court for the Eastern District of Texas, Sherman Division, Dec. 20, 2019, 84 pages.
"*Wapp Tech Limited Partnership and Wapp Tech Corp.*, v. *Bank of America Corp.*, Defendant's P.R. 3-3 Invalidity Contentions: Appendix B-1," United States District Court for the Eastern District of Texas, Sherman Division, Dec. 20, 2019, 1372 pages.
"*Wapp Tech Limited Partnership and Wapp Tech Corp.*, v. *Bank of America Corp.*, Defendant's P.R. 3-3 Invalidity Contentions: Appendix B-2," United States District Court for the Eastern District of Texas, Sherman Division, Dec. 20, 2019, 1917 pages.
"*Wapp Tech Limited Partnership and Wapp Tech Corp.*, v. *Bank of America Corp.*, Defendant's P.R. 3-3 Invalidity Contentions: Appendix B-3," United States District Court for the Eastern District of Texas, Sherman Division, Dec. 20, 2019, 1924 pages.
"*Wapp Tech Limited Partnership and Wapp Tech Corp.*, v. *Bank of America Corp.*, Defendant's P.R. 3-3 Invalidity Contentions: Appendix B-4," United States District Court for the Eastern District of Texas, Sherman Division, Dec. 20, 2019, 1993 pages.
"*Wapp Tech Limited Partnership and Wapp Tech Corp.*, v. *Bank of America Corp.*, Defendant's P.R. 3-3 Invalidity Contentions: Appendix B-5," United States District Court for the Eastern District of Texas, Sherman Division, Dec. 20, 2019, 491 pages.
"*Wapp Tech Limited Partnership and Wapp Tech Corp.*, v. *Bank of America Corp.*, Defendant's P.R. 3-3 Invalidity Contentions: Appendix C," United States District Court for the Eastern District of Texas, Sherman Division, Dec. 20, 2019, 11 pages.
"*Wapp Tech Limited Partnership and Wapp Tech Corp.*, v. *Bank of America Corp.*, Defendant's P.R. 3-3 Invalidity Contentions: Exhibits 1-28," United States District Court for the Eastern District of Texas, Sherman Division, Dec. 20, 2019, 4550 pages. Submitted in Ten Parts.
"*Wapp Tech Limited Partnership and Wapp Tech Corp.*, v. *Seattle Spinco, Inc.*, et al. Defendants' P.R. 3-3—Invalidity Contentions," United States District Court for the Eastern District of Texas, Sherman Division, Dec. 20, 2019, 43 pages.
"*Wapp Tech Limited Partnership and Wapp Tech Corp.*, v. *Seattle Spinco, Inc., et al.*, Defendants' P.R. 3-3—Invalidity Contentions: Appendix A," United States District Court for the Eastern District of Texas, Sherman Division, Dec. 20, 2019, 84 pages.
"*Wapp Tech Limited Partnership and Wapp Tech Corp.*, v. *Seattle Spinco, Inc., et al.*, Defendants' P.R. 3-3—Invalidity Contentions: Appendix B-1," United States District Court for the Eastern District of Texas, Sherman Division, Dec. 20, 2019, 1372 pages.
"*Wapp Tech Limited Partnership and Wapp Tech Corp.*, v. *Seattie Spinco, Inc., et al.*, Defendants' P.R. 3-3—Invalidity Contentions: Appendix B-2," United States District Court for the Eastern District of Texas, Sherman Division, Dec. 20, 2019, 1917 pages.
"*Wapp Tech Limited Partnership and Wapp Tech Corp.*, v. *Seattle Spinco, Inc., et al.*, Defendants' P.R. 3-3—Invalidity Contentions: Appendix B-3," United States District Court for the Eastern District of Texas, Sherman Division, Dec. 20, 2019, 1924 pages.
"*Wapp Tech Limited Partnership and Wapp Tech Corp.*, v. *Seattle Spinco, Inc., et al.*, Defendants' P.R. 3-3—Invalidity Contentions: Appendix B-4," United States District Court for the Eastern District of Texas, Sherman Division, Dec. 20, 2019, 1993 pages.
"*Wapp Tech Limited Partnership and Wapp Tech Corp.*, v. *Seattle Spinco, Inc., et al.*, Defendants' P.R. 3-3—Invalidity Contentions: Appendix B-5," United States District Court for the Eastern District of Texas, Sherman Division, Dec. 20, 2019, 491 pages.
"*Wapp Tech Limited Partnership and Wapp Tech Corp.*, v. *Seattle Spinco, Inc., et al.*, Defendants' P.R. 3-3—Invalidity Contentions: Appendix C," United States District Court for the Eastern District of Texas, Sherman Division, Dec. 20, 2019, 11 pages.
"*Wapp Tech Limited Partnership and Wapp Tech Corp.*, v. *Seattle Spinco, Inc., et al.*, Defendants' P.R. 3-3—Invalidity Contentions: Exhibits 1-28," United States District Court for the Eastern District of Texas, Sherman Division, Dec. 20, 2019, 4550 pages. Submitted in Ten Parts.
"*Wapp Tech Limited Partnership and Wapp Tech Corp.*, v. *Wells Fargo & Company*, Defendant's P.R. 3-3 Invalidity Contentions," United States District Court for the Eastern District of Texas, Sherman Division, Dec. 20, 2019, 43 pages.
"*Wapp Tech Limited Partnership and Wapp Tech Corp.*, v. *Wells Fargo & Company*, Defendants' P.R. 3-3—Invalidity Contentions: Appendix A," United States District Court for the Eastern District of Texas, Sherman Division, Dec. 20, 2019, 84 pages.

(56) References Cited

OTHER PUBLICATIONS

"*Wapp Tech Limited Partnership and Wapp Tech Corp.*, v. *Wells Fargo & Company*, Defendants' P.R. 3-3—Invalidity Contentions: Appendix B-1" United States District Court for the Eastern District of Texas, Sherman Division, Dec. 20, 2019, 1372 pages.
"*Wapp Tech Limited Partnership and Wapp Tech Corp.*, v. *Wells Fargo & Company*, Defendants' P.R. 3-3—Invalidity Contentions: Appendix B-2," United States District Court for the Eastern District of Texas, Sherman Division, Dec. 20, 2019, 1917 pages.
"*Wapp Tech Limited Partnership and Wapp Tech Corp.*, v. *Wells Fargo & Company*, Defendants' P.R. 3-3—Invalidity Contentions: Appendix B-3," United States District Court for the Eastern District of Texas, Sherman Division, Dec. 20, 2019, 1924 pages.
"*Wapp Tech Limited Partnership and Wapp Tech Corp.*, v. *Wells Fargo & Company*, Defendants' P.R. 3-3—Invalidity Contentions: Appendix B-4," United States District Court for the Eastern District of Texas, Sherman Division, Dec. 20, 2019, 1993 pages.
"*Wapp Tech Limited Partnership and Wapp Tech Corp.*, v. *Wells Fargo & Company*, Defendants' P.R. 3-3—Invalidity Contentions: Appendix B-5," United States District Court for the Eastern District of Texas, Sherman Division, Dec. 20, 2019, 491 pages.
"*Wapp Tech Limited Partnership and Wapp Tech Corp.*, v. *Wells Fargo & Company*, Defendants' P.R. 3-3—Invalidity Contentions: Appendix C," United States District Court for the Eastern District of Texas, Sherman Division, Dec. 29, 2019, 11 pages.
"*Wapp Tech Limited Partnership and Wapp Tech Corp.*, v. *Wells Fargo & Company*, Defendants' P.R, 3-3—Invalidity Contentions: Exhibits 1-28," United states District Court for the Eastern District of Texas, Sherman Division, Dec. 20, 2019, 4550 pages. Submitted in Ten Parts.
"Wind River Workbench Product Note," Wind River, Web Archive Dated Jan. 31,2095, retrieved from https://web.archive.org/web/20050131042600/http:/www.windriver.com/products/development_tools/ide/wind_river_workbench/wr_workbench-pn.pdf, 22 pages.
Andersson, "Chapter 14: Testing the Wireless Applications," in "GPRS and 3G Wireless Applications: Professional Developers Guide," John Wiley & Sons, Inc., New York, NY, 2001.
Andersson, "Mobile Internet—An industry-wide paradigm shift," Ericsson Review, No. 4, 1999, pp. 206-213.
Avvenuti et al., "Internet Emulation for Java Applications through Socket Factories," Proceedings of the 26th Annual International Computer Software and Applications Conference, 2002, 6 pages.
Binder et al., "Mobile Systems Verification Corporation Investor Presentation," ARCH Venture Partners, Jan. 17, 2002, 48 pages.
Binder et al., "The Advanced Mobile Application Testing Environment," Mobile Systems Verification Corporation, 2093, 29 pages.
Binder, "Chicago Start-up Previews Next Generation Wireless Testing," Mobile Systems Verification Corporation, 2002, 1 page.
Bourgois et al., "Necessity of an Emulator to Validate New Resources Allocation Protocols," Institute of Electrical and Electronics Engineers VTS 53rd Vehicular Technology Conference, May 2001, pp. 3049-3052.
Caporuscio et al., "An Experience in Evaluating Publish/Subscribe Services in a Wireless Network," WOSP '02: Proceedings of the 3rd International Workshop on Software and Performance, Jul. 2002, pp. 128-133.
Carson et al., "NIST Net ~ A Linux-based Network Emulation Tool," ACM SIGCOMM Computer Communications Review, vol. 33, No. 3, Jul. 2003, pp. 111-126.
Combee et al., "Chapter 7: Debugging Web Clipping Applications," In "Palm OS Web Application Developer's Guide," Syngress Publishing, Rockland, MA, 2001, pp. 1-2, 195-222.
Davies et al., "A Network Emulator to Support the Development of Adaptive Applications," Proceedings of 2nd USENIX Symposium on Mobile and Location Independent Computing, Ann Arbor, U.S., Apr. 1995, 9 pages.
Davies et al., "Evaluating a location-based application; a hybrid test and simulation environment," Pervasive Computing, Jul. 2004, pp. 48-56.

Drogseth et al., "Delivering WAN-ready applications with Shunra," Network World, Oct. 11, 2004, 4 pages.
Dubie, "Shunra updates network simulation, profiling tool," Network World, Feb. 9, 2006, 3 pages.
Gayraud et al., "Two-Stage Wireless Network Emulation," In "Broadband Satellite Comunication Systems and the Challenges of Mobility," IFIP TC6 Workshops on Broadband Satellite Communication Systems and Challenges of Mobility, World Computer Congress, Aug. 2004, pp. 181-190.
Hernandez et al., "Ramon: Rapid-Mobility Network Emulator," Proceedings of the 27th Annual IEEE Conference on Local Computer Networks, 2002, 9 pages.
Holland, "Wireless Network Emulation System (WiNE)," HRL Laboratories, LLC Mar. 30, 2005, 14 pages.
Jiang et al., "A Portable Real-time Emulator for Testing Multi-Radio MANETs," Proceedings of the 20th International Parallel and Distributed Processing Symposium, Apr. 2006, 18 pages.
Jin et al., "Designing and Implementing of a Wireless Network Emulator," Canadian Conference on Electrical and Computer Engineering, May 2004, 5 pages.
Kennedy, "Shunra unleashes an enterprise testing Storm," InfoWord, Mar. 26, 2004, 5 pages.
Kenny et al., "Methods and Apparatus for Collecting and Reporting Performance Parameters for a Wireless Device," U.S. Appl. No. 60/665,293, dated Mar. 25, 2005, 21 pages.
Kojo et al., "Seawind: A Wireless Network Emulator," 2001 Aachen International Multiconference on Measurement, Modelling, and Evaluation of Computer-Communication Systems, Sep. 2001, 19 pages.
Kral et al., "An Integrated Software Development and Porting System for Wireless Devices," U.S. Appl. No. 60/688,243, dated Jun. 6, 2005, 40 pages.
Mahesh et al., "Device Pack and Version Specific Brew Simulation Libraries," U.S. Appl. No. 60/520,047, dated Nov. 13, 2003, 29 pages.
Nikkarinen et al., "Cosime: Real-life Cellular Network on the Desktop," Proceedings of the Joint International Conference on Autonomic and Autonomous Systems and International Conference on Networking and Services, Oct. 2005, 8 pages.
Noble et al., "Trace-Based Mobile Network Emulation," Proceedings of ACM SIGCOMM, Sep. 1997, 11 pages.
Parkvall et al., "WCDMA evolved—High-speed packet-data services,"Ericsson Review, No. 2, 2003, pp. 56-65.
Patzschke, "Systems and Methods for Monitoring and Evaluating a Connectivity Device," U.S. Appl. No. 60/586,426, dated Jul. 8, 2004, 55 pages.
Rajeev et al., "Preferred Roaming List Tracer," U.S. Appl. No. 60/893,462 dated Jun. 23, 2005, 21 pages.
Reves et al., "Real-Time Demonstrator for QoS Testing in 3G/4G Mobile Networks with IP Multimedia Applications," The Fifth European Wirless Conference: Mobile and Wireless Systems Beyond 3G, accepted Nov. 20, 2003, 9 pages.
Rhodes et al., "Chapter 6: Memory Manager," In "Palm OS Programming: The Developer's Guide," O'Reilly & Associates, Inc., Sebastopol, CA, 2002, pp. 1-2, 171-247.
Rischpater, "Chapter 3: Developing for the Qualcomm Brew Platform," In "Software Development for the Qualcomm Brew Platform," Springer-Verag, New York, NY, 2003, pp. 1-2, 33-62.
Satoh, "Software Testing for Wireless Mobile Computing," IEEE Wireless Communications, vol. 11, No. 5, Oct. 2004, pp. 58-64.
Teyeb et al., "RESPECT: A Real-time Emulator for Service Performance Evaluation of Celluar Networks," IEEE 62nd Vehicular Technology Conference, vol. 1, Sep. 2005, pp. 402-406.
Topley et al., "Chapter 9: J2ME Programming Environments," in "J2ME in a Nutshell: A Desktop Quick Reference," pp. 267-299.
Wells, "J2ME Game Programming," Premier Press, Boston, MA, pp. 1-2, 13-268.
"A Simple MIDP Application", http://dsc.sun.com/mobility/midp/chapters/j2mewhite/chap04.pdf, Developing MI DP Applications, Chapter 4, Mar. 2002.
"Achieving Effective QoE in Networked Application and Infrastructure Before Deployment with Shunra's 'Virtual Enterprise'," Enterprise Management Associates, Mar. 2005, 6 pages.

(56) References Cited

OTHER PUBLICATIONS

"Agreement and Plan of Merger," Hewlett Packard Enterprise Company, Sep. 7, 2016, 121 pages.
"BlackBerry Java Development Environment Version 3.6," Research in Motion, Mar. 21, 2003, 248 pages.
"BlackBerry Simulator Version 3.6," Research in Motion, Apr. 10, 2003, 28 pages.
"Corporate Backgrounder," Shunra, Date Unknown, 2 pages.
"Creating a BREW Application from Scratch in Visual Studio 2005," QUALCOMM, Apr. 28, 2006, 10 pages.
"Creating a BREW Application from Scratch," QUALCOMM, Oct. 23, 2002, 49 pages.
"Creating BREW Applications Using Visual Studio .NET," QUALCOMM, Mar. 11, 2003, 16 pages.
"Data Sheet: LoadRunner," Micro Focus, 2018, 5 pages.
"Dtrace User Guide," Sun Microsystems, 2006, 44 pages.
"EEMBC Benchmarks for the Java 2 Micro Edition J2ME Platform," EEMBC, May 2003, 5 pages.
"EPOC Emulator," Symbian, 1997, 14 pages.
"Getting Started", Openwave Systems, Inc, Jun. 2002, 24 pages.
"HP LoadRunner and HP Performance Center with Shunra Network Virtualization," Hewlett Packard Enterprise Company, Oct. 2013, 4 pages.
"HP Network Virtualization for Mobile," Hewlett Packard Enterprise Company, Mar. 2014, 4 pages.
"Interim Financial Statements for the Period from May 1, 2017 to Aug. 21, 2018," Micro Focus International PLC, 2018, 10 pages.
"J2ME Programming/MIDP Device Databases," Wikibooks, Apr. 28, 2010, 3 pages.
"Java Application Profiling using TPTP," International Business Machines Corp., Jul. 11, 2006, 12 pages.
"JBenchmark Homepage," JBenchmark, Feb. 10, 2005, 1 page.
"JBenchmark Mobile Java (J2ME) Performance Tools," JBenchmark, Feb. 5, 2005, 1 page.
"Macromedia FlashCast FAQ," 2006, 4 Pages.
"Mercury LoadRunner Tutorial, Version 8.1," Mercury, 2004, 137 pages.
"Microfocus International PLC Interim Results for the Six Months Ended Apr. 30, 2018," Micro Focus, Jul. 11, 2018, 52 pages.
"Microfocus International PLC Interim Results for the Six Months Ended Oct. 31, 2017," Micro Focus, Jan. 8, 2018, 68 pages.
"Motorola SDK iDEN Development and Runtime Utilities," Motorola, 2005, 106 pages.
"Native and Hybrid App Support," Micro Focus, Aug. 29, 2018, 5 pages.
"NetBeans IDE 4.1" NetBeans, May 2005, 49 pages.
"Network Computing Magazine Tests with Shunra Software's Preemptive Infrastructure Permancne Management Solutions," Business Wire, Apr. 28, 2003, 2 pages.
"Press Release: Mercury Announces Mercury Performance Center 8.1," Mercury, Oct. 10, 2005, 2 pages.
"Product Briefs," ADT Mag, Jun. 1, 2004, 6 pages.
"Professional Flash Lite User Manual, 2nd Edition," Macromedia, Aug. 2003, 22 Pages.
"Record Scripts," Micro Focus, Aug. 29, 2018, 6 pages.
"Seattle Spinco, Inc. and Entit Software LLC, v. Wapp Tech Limited Partnership and Wapp Tech Corp., Complaint for Declaratory Judgment," United States District Court for the District of Delaware, Oct. 15, 2018, 34 pages.
"Series 60 Developer Platform: Debugging Software with Borland C++BuilderX," Nokia, Jan. 12, 2004, 27 pages.
"Shunra Network Tools and Sony Playstation 2," TMCNet, Jul. 28, 2004, 6 pages.
"Starting with BREW," QUALCOMM, Apr. 27, 2004, 86 pages.
"StormRunner Load Help Center," Micro Focus, Feb. 1, 2018, 2 pages.
"The Network Connection", http://dsc.sun.com/mobility/midp/chapters/j2mewhite/chap13.pdf, The Generic Connection Framework, Chapter 13, Mar. 2002.

"The Shunra Virtual Enterprise Product Family," Shunra, 2004, 2 pages.
"United States Securities and Exchange Commission Form 8-K," Hewlett Packard Enterprise Company, Sep. 7, 2016, 9 pages.
"Unprocessed JBenchmark 2 Results," Jbenchmark, Feb. 4, 2005, 3 pages.
"User's Guide: Wireless Toolkit, Version 2.1 Java 2 Platform, Micro Edition," Sun Microsystems, Dec. 2003, 122 pages.
"Wapp Tech Limited Partnership and Wapp Tech Corp., v. Bank of America Corp., Plaintiff's Opposition to Defendant's Motion to Stay," United States District Court for the Eastern District of Texas, Sherman Division, Oct. 31, 2018, 35 pages.
"Wapp Tech Limited Partnership and Wapp Tech Corp., v. Hewlett Packard Enterprise Co., Plaintiff's Opposition to Defendant's Motion to Stay," United States District Court for the Eastern District of Texas, Sherman Division, Nov. 1, 2018, 48 pages.
"Wapp Tech Limited Partnership and Wapp Tech Corp., v. Micro Focus International PLC, Plaintiff's Opposition to Defendant's Motion to Dismiss," United States District Court for the Eastern District of Texas, Sherman Division, Oct. 31, 2018, 69 pages.
"Wapp Tech Limited Partnership and Wapp Tech Corp., v. Micro Focus International PLC, Plaintiff's Original Complaint," United States District Court for the Eastern District of Texas, Sherman Division, Jul. 2, 2018, 29 pages.
"Wapp Tech Limited Partnership and Wapp Tech Corp., v. Wells Fargo & Company, Plaintiff's Opposition to Defendant's Motion to Stay," United States District Court for the Eastern District of Texas, Sherman Division, Oct. 31, 2018, 24 pages.
"Windows CE Development, Testing, and Tuning," Compuware NuMega, Date Unknown, 8 pages.
"Working with Emulators," Micro Focus, Aug. 29, 2018, 4 pages.
Adobe, "Max Sneak Peeks", MAX 2005 Articles, Oct. 2005, 12 Pages.
Adobe, "Unable to use a handset emulator to test Flash Lite content", Feb. 28, 2005, 1 page.
Adobe, FlashCast Add-in for Flash MX Professional 2004, 2009, 3 Pages.
Campbell, "Letter to Dr. TW Stevenson", Adobe Systems, Inc, Jan. 14, 2005, 2 Pages.
Compuware, "Windows CE Development, Testing and Tuning", Compuware NuMega, no date available.
De Herrera, "Windows Mobile 5.0 Emulator", Pocket PC FAQ, 2005, 9 pages.
Harrison, et al., "Appendix 4: Emulator Reference", Symbian OS for Mobile Phones, 2003, 15 pages.
Hewgill, "Copilot: Design and Development," Handheld Systems, May/Jun. 1998, 3 pages.
Kane Computing, LTD, , "Code Composer Studio Development Tools v3.1 ", Getting Started Guide, Texas Instruments, May 2005.
Kennedy, Storm STX-100 Box Profiles Your App Performance Under Variable Network Conditions, InfoWorld, Mar. 26, 2004, 5 pages.
Knudsen, "New Features in the J2ME Wireless Toolkit 1.0.4," Jun. 2002, 5 pages.
Li et al., "Beginning J2ME: From Novice to Professional, Third Edition," 2005, Apress, Berkeley, CA, 47 pages.
Lorimer, "Get Started Profiling Applications in Eclipse," EclipseZone, Oct. 13, 2005, 16 pages.
Maas, , "Using Palm OS Emulator", PalmSource, Mar. 2002, 238 pages.
Moore, "Wireless Apps Require Vigilant Monitoring," ComputerWorld, Aug. 18, 2000, 2 pages.
Morrison, "Day 3: Wireless Java with J2ME", InformIT, Jun. 17, 2001, 23 pages.
Morrison, "Getting to Know the J2ME Emulator", J2ME Emulator Essentials, Aug. 17, 2001.
Motorola, "iDEN Development and Runtime Utilities", Motorola, 2005.
Musich, "Shunras Network Modeling Tool Replicates WANs," eWeek, Apr. 28, 2005, 4 pages.
Nokia, "Release Note for Nokia's Series 60", Release Note for Nokia's Series 60, 2nd Edition SOK for Symbian OS Supporting Feature Pack 3, Jun. 17, 2005, 5 Pages.

(56) References Cited

OTHER PUBLICATIONS

NTT DOCOMO, "Flash Lite Authoring Guidelines for the i-mode Service", MX Professional 2004, 1st Edition, Mar. 2003, 48 Pages.
Pratschner, "Analyzing Device Application Performance with the .Net Compact Framework Remote Performance Monitor," Microsoft Developer, Apr. 17, 2005, 8 pages.
Rollin, "Palm OS Emulator 2.1/3.0," Palm Computing, Jul. 24, 1998, 35 pages.
Rollin, "The Palm OS Emulator," Handheld Systems, May/Jun. 1998, 6 pages.
Sarkar et al., "A Review of Simulation of Telecommunication Networks: Simulators, Classification, Comparison, Methodologies, and Recommendations," Journal of Selected Areas in telecommunications, Mar. 2011, pp. 10-17.
Satoh, "A Testing Framework for Mobile Computing Software", IEEE Computer Society, IEEE Transactions on Software Engineering; vol. 29 No. 12, Dec. 2003.
Sharma et al., "Network Simulators for Next Generation Networks: An Overview," International Journal of Mobile Network Communications & Telematics, vol. 4, No. 4, Aug. 2014, pp. 39-51.
Snyder, "How we tested Symantec's Mail Security 8100 Series applicance," Network World, Apr. 11, 2005, 2 pages.
Stevenson, "Code Composer Studio IDE v3 White Paper", Jul. 2004.
Sun Java System, "J2EE 1.4 Platform", NetBeans, May 2005.
Sun Microsystems, "J2ME Wireless Toolkit", User's Guide, Version 2.2, Oct. 2004.
Sun Microsystems, "White Paper on KVM and the Connected, Limited Device Configuration (CLDC)", J2ME Building Blocks for Mobile Devices, May 19, 2000.
Symbian, "EPOC Emulator", 1997.
Talbot, "Creating Flash Lite Applications", Adobe, 2006, 38 Pages.
Taylor, "AgentJ: Enabling Java for NS-2 Simulations of Distributed Network Applications," 2nd International Conference on Distributed Frameworks for Multimedia Applications, May 2006, 6 pages.
Taylor, Michael "J2ME IDE Comparison", Development Consulting Limited Version 1.1, Jun. 29, 2002.
Texas Instruments, "Code Composer Studio v3.0", Getting Started Guide, Sep. 2004.
Texas Instruments, "Code Composer Studio v5", Texas Instruments Embedded Processors Wiki, No date available.
Thinkvillage-Kiwi LLC, "Complaint and Demand for Jury Trial", Case No. CV 08-4166 JL, Sep. 1, 2008, 12 Pages.
Vaughan, "Brave New Performance Management World," ADT Mag, Jan. 1, 2004, 5 pages.
Weinberg, "Shunra's Storm is a hardware-based network modeling tool that does a great job on the WAN," NetworkWorld, Nov. 2, 2004, 3 pages.
Yi et al., "World Performance: Help Device Developers Build Better Applications," Java World, Oct. 25, 2002, 17 pages.
Yuan, "Developing J2ME Applications with EclipseME", IBM, Nov. 30, 2004, 41 pages.
Official Action for U.S. Appl. No. 14/581,475, dated May 17, 2017, 12 pages.
Notice of Allowance for U.S. Appl. No. 14/581,475, dated Jan. 11, 2018, 5 pages.
Official Action for U.S. Appl. No. 13/673,692, dated Nov. 6, 2013, 6 pages.
Notice of Allowance for U.S. Appl. No. 13/673,692, dated Jul. 17, 2014, 5 pages.
Official Action for U.S. Appl. No. 12/759,543, dated Mar. 15, 2012, 7 pages.
Notice of Allowance for U.S. Appl. No. 12/759,543, dated Sep. 6, 2012, 5 pages.
Official Action for U.S. Appl. No. 11/449,958, dated Jun. 1, 2009, 10 pages.
Official Action for U.S. Appl. No. 11/449,958, dated Aug. 26, 2009, 10 pages.
Official Action for U.S. Appl. No. 11/449,958, dated Nov. 17, 2009, 11 pages.
Official Action for U.S. Appl. No. 11/449,958, dated Dec. 3, 2009, 11 pages.
Official Action for U.S. Appl. No. 11/449,958, dated Apr. 19, 2010, 11 pages.
Notice of Allowance for U.S. Appl. No. 11/449,958, dated Aug. 16, 2010, 4 pages.
Official Action for U.S. Appl. No. 15/979,330, dated Oct. 5, 2018, 9 pages.
Notice of Allowance for U.S. Appl. No. 15/979,330, dated Apr. 5, 2019, 6 pages.

SYSTEMS INCLUDING NETWORK SIMULATION FOR MOBILE APPLICATION DEVELOPMENT

CROSS REFERENCE TO RELATED APPLICATIONS

This application is a continuation of U.S. patent application Ser. No. 13/673,692, filed Nov. 9, 2012, which is a continuation of U.S. patent application Ser. No. 12/759,543, filed Apr. 13, 2010, and issued as U.S. Pat. No. 8,332,203, on Dec. 11, 2012, which is a continuation of U.S. patent application Ser. No. 11/449,958, filed Jun. 9, 2006, and issued as U.S. Pat. No. 7,813,910, on Oct. 12, 2012, which application claims priority to U.S. Patent Application No. 60/689,101 filed Jun. 10, 2005. These applications and patent are incorporated herein by reference, in their entirety, for any purpose.

BACKGROUND

It is estimated that the mobile market is evolving at five times the speed of the eCommerce market. It is estimated that nearly 700 million new mobile devices will be shipped in 2005, with a new handset model being launched every other day. This rapid mobile device development requires that applications designed to run on these mobile devices also sustain rapid development. Development systems targeted at one mobile device may become obsolete and possibly of little value to the developer at the time it is shipped as well as development life cycles.

Many new mobile devices include a display management engine called a Flash Player; one example of a Flash Player suitable for mobile devices is FlashLite, developed by Macromedia. The Flash Player provides a common application platform for playing applications on the mobile devices and allows developers to develop applications that may be played on multiple mobile devices that include the Flash Player. Applications for mobile devices are typically developed on a personal computer (PC) or workstation and target one or more types of mobile device that include a Flash Player. These applications require real-time testing of the application on all applicable mobile devices. Although a Flash Player application may operate correctly on one mobile device model, it may crash when playing on a different mobile device model. For example, a NOKIA 6600 has a 16% reduction in ARM CPU speed and available memory resources compared to a NOKIA 7610, thus an application that plays correctly on the NOKIA 7610 may not play correctly on the NOKIA 6600 due to this drop in inherent resources.

Development packages (e.g., FlashMX by Macromedia) are available to run on a PC and allow development of Flash Player applications for one or more mobile devices. However, although these development packages may simulate operation of the application playing on the targeted mobile device, they do not determine if the application will play correctly on the targeted mobile device based upon resource usage. Currently, the only way to determine if an application plays on a particular mobile device is to transfer the application to the device and play it. During development of an application for a mobile device, an application author may transfer and play the application hundreds of times (development life cycles) on the targeted mobile device before identifying and correcting all system resource problems within the application. Where an application is targeted to play on many types of mobile device, it must be transferred and tested on a mobile device representative of each targeted mobile device type. This transferring and testing process is time-consuming and therefore costly for the application author.

Further, having accessibility to all available mobile devices in targeted geographical markets worldwide as well as real-time interaction with network Operators to measure and emulate network characteristics within each market is presently not possible.

SUMMARY OF THE INVENTION

In one embodiment, a method emulates and profiles an application to play on a mobile device that includes a Flash Player. Characteristics defining performance of the mobile device are loaded. The mobile device is emulated using a model based upon the characteristics. The application is played and monitored within the model to determine resource utilization of the application for the mobile device.

In another embodiment, a method authors, emulates and profiles an application to play on a mobile device that includes a Flash Player. The application is authored using an application development tool and the mobile device is emulated using a model based upon the characteristics. The application is played within the model and the model is monitored to determine resource utilization of the application for the selected mobile device.

In another embodiment, a method authors an application to play on a mobile device that includes a Flash Player. The application is authored using an application development tool. Resource utilization of the application for the mobile device is estimated. The steps of authoring and estimating are repeated until the resource utilization is less than or equal to the resources available on the mobile device.

In another embodiment, a software product has instructions, stored on computer-readable media, wherein the instructions, when executed by a computer, perform steps emulating and profiling an application to play on a mobile device that includes a Flash Player, including: instruction for loading characteristics defining performance of the mobile device; instruction for emulating the mobile device using a model based upon the characteristics; instruction for playing the application within the model; and instruction for monitoring the application playing in the model to determine resource utilization of the application for the mobile device.

In another embodiment, an emulator profiles an application of a mobile device that includes a Flash Player, including: means for generating a model of the mobile device based upon mobile device characteristics, and means for playing the application within the model to determine resource utilization of the application when played by the mobile device.

In another embodiment, a method determines whether an application of a mobile device is operable. Characteristics are downloaded over Internet for one or more mobile devices to be emulated and the application for the mobile devices is tested, via the Internet, using an emulator to determine if the application is operable on the mobile device.

DETAILED DESCRIPTION

Figure 1A:
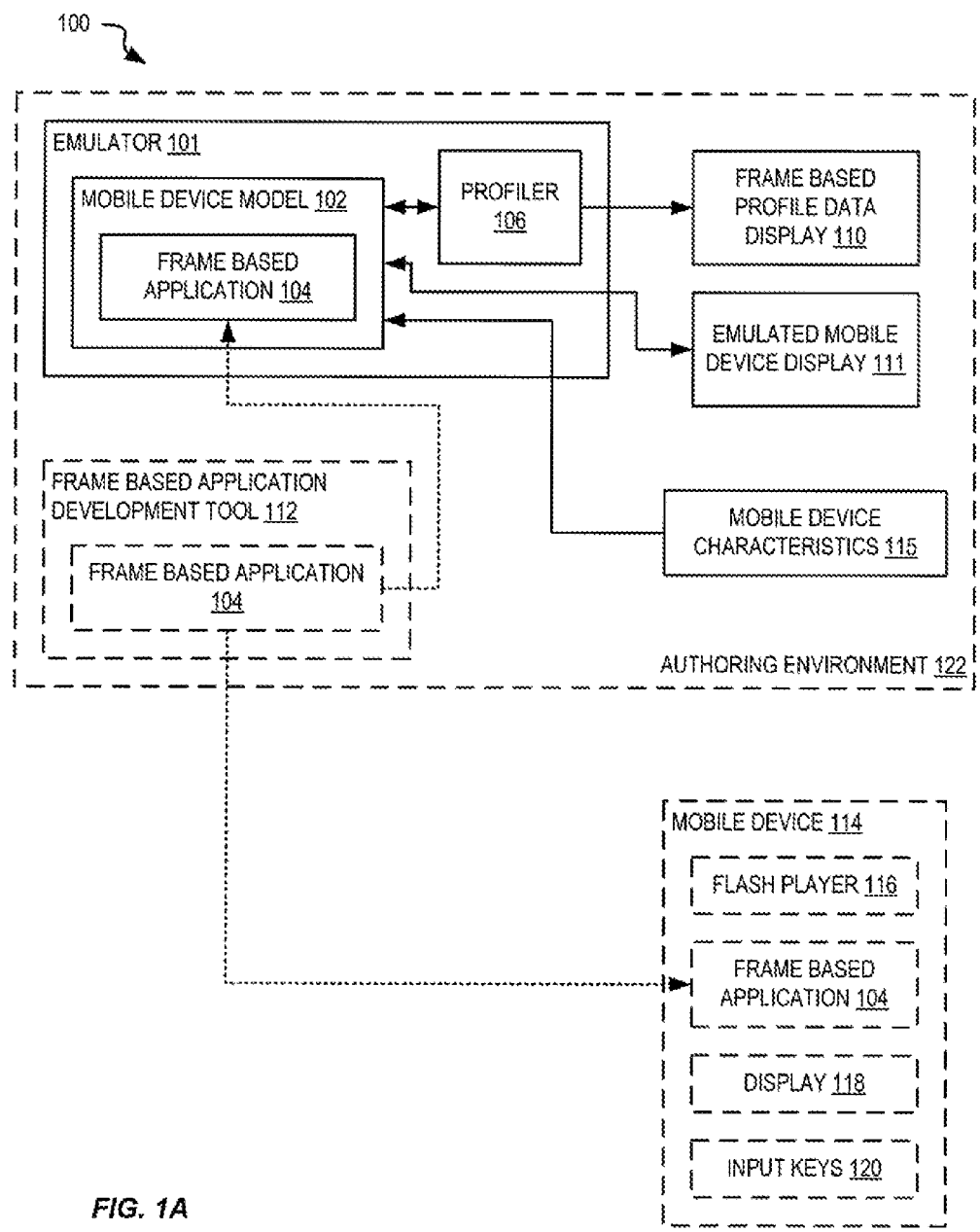
FIG. 1A shows one exemplary embodiment of a system for emulating, authoring and visually profiling an application playing on a mobile device that includes a Flash Player.

THE PERSONALIZATION OF MOBILE COMMERCE. A perfect storm is emerging in one of the largest consumer markets to date—mobile commerce. Industry analysts estimate that the mobile commerce market will reach an unprecedented 500 billion dollars per annum by 2008 worldwide. In 2003, the ARPU (Average Revenue Per User) in mobile commerce was $72 dollars. In 2008 it Is predicted to reach an average of $332 dollars per user. What will drive the ARPU to reach 4-5 times what It Is today? More specifically, as this new global market emerges, which platform(s) will sustain this unprecedented market opportunity?

Early frontrunners like Java, .NET and BREW have taken great strides in the early/formative years, the likes of SurfKitchen, Action Engine, MFORMA and others taking SMS, MMS and mobile gaming to exciting consumer levels. However, with a market primarily based on the Java and J2ME platform, mobile content and entertainment revenues achieved less than 3% of the total mobile service revenue and less than 19% of non-voice revenue.

Is this a failure? Based on current market projections and a weighted ARPU, total consumer spending on mobile content will only achieve approximately 72Bn by 2008. With the inherent runtime limitations of these current languages, consumer uptake of mobile content will reach approximately ⅐ or 14% of the total projected levels by 2008. Therefore, either Java and the early frontrunners will substantially evolve to become a more consumer-adapted platform to meet an unprecedented market need, or a new platform will emerge to drive mobile commerce to projected levels.

CONSUMERS WILL LEAD MOBILITY THE LEADERS WILL FOLLOW. 'Software for the People' is a paradigm shift in client side personalization and mobile architecture. Called Active2Play™, this new platform places the personalization of content directly into the hands of the consumer on the client side, similar to what Windows® achieved for the PC. What Symbian is for the handset, Active2Play™ is for the consumer, a personalized windows environment allowing the first customizable application environment for the consumer. To this end, 'Software for the People' is built upon three personalized mobile platforms: Active2Play™ Consumer, Active2Play™ UI and Active2Play™ Marketplace.

Active2Play™ Consumer allows the end user the ability to personalize their content operating experience Over-the-Air, delivering an unparalleled platform of client side consumer personalization. From this architecture Kiwi has developed three Consumer Branded platforms: VASports™ (a personalized Over-the-Air consumer sport line); ImageVu™ (a personalized Over-the-Air photo imaging line); and CouponVu™ (A personalized Over-the-Air corporate branding and one-to-one marketing line).

Alongside of the Active2Play™ Consumer platform, Kiwi offers an industry first Flash Lite end-to-end service platform called Active2Play™ UI, enabling realtime branding and personalization of the mobile user interface. Unlike the J2ME platform, Active2Play™ UI dramatically reduces Server Crosstalk™ (a client side architecture), and can be managed and updated Over-the-Air by the consumer, operator and handset maker providing realtime personalization and brand marketing of the handset user Interface.

Active2Play™ Marketplace is an Open Application Marketplace™ for the aggregation and distribution of Flash Lite content, the third and final piece in the Flash Lite ecosystem. From server content distribution, to live variable billing and provisioning, Active2Play™ Marketplace provides an open and accessible platform for the Flash lite developer community to rapidly deploy Flash Lite content. Active2Play™ Marketplace will be deployable within 9 to 12 months of funding.

KIWI REVENUE MODEL. Kiwi estimates that its Flash Lite and Active2Play™ platform revenues will come from four primary models: (1) Mass-market per handset license fees for embedded applications with handset makers; (2) Mass-market per subscriber license fees for revenue sharing applications with operators; (3) Mass-market per handset license fees for personalized UI's and brand marketing; and (4) Active2Play™ Marketplace, content aggregation and distribution services as the Flash Lite developer community reaches a critical mass.

With the ability to achieve commerce anywhere at anytime, Mobile Commerce presents a unique and global platform for handset makers, operators and consumers alike. "Globally, there were 94.9 million mCommerce users at the end of [2003], and this is predicted to grow to 1.67 billion users by 2008. Meanwhile over the same period revenues from mCommerce will grow globally from US$6.86 billion in 2003 to over US $554.37 billion. Telecom Trends International (TTI) Apr. 20, 2004.

As the ecommerce market moves beyond the personal computer to embrace the 'edge' or wireless community via the cell phone, companies are aggressively moving to capitalize on a new and emerging 500 billion dollar mCommerce market. With the economic potential of 1.67 billion users by 2008 connecting to the Internet anytime, anywhere to view or buy anything they want via their mobile device, a new breed of company will emerge with the ability to rethink, redesign and re-engineer its architecture to adapt to the 'client side' specifics of mCommerce. The convenience of 'point of sale' anywhere-you-go will mark an unprecedented cultural shift in consumer buying patterns within international markets.

FIG. 1A shows one exemplary embodiment of a system 100 for emulating and profiling a frame based application 104 playing on a mobile device 114 that includes a Flash Player 116. System 100 is shown with an emulator 101, a profiler 106 and a display 110. Emulator 101 generates a mobile device model 102, based upon mobile device characteristics 115 of mobile device 114. Model 102 emulates mobile device 114 to play frame based application 104 and may, for example, generate an emulated mobile device display 111 that represents mobile device 114. Emulated mobile device display 111 may be interactive to allow a user to interact (in a manner similar to interacting with device 114) with application 104 while playing within model 102.

Profiler 106 monitors playing of frame based application 104 within model 102 to estimate resource usage of application 104 and generates a frame based profile data display 110. Frame based profile data display 110 may allow a user of system 100 to identify areas within application 104 that would exceed resources of mobile device 114.

Application 104 may be developed using a frame based application development tool 112 (indicated in dashed outline). Frame based application development tool 112 may, for example, represent Flash MX or Studio 8 from MacroMedia (now Adobe Systems). Once the user of system 100 has verified that application 104 does not exceed resources of mobile device 114, development tool 112 may be instructed to publish application 104 to device 114, as shown.

In one example of operation, development tool 112 is used to develop frame based application 104. Application 104 is transferred to emulator 101 for playing within mobile device model 102 to estimate resource usage of application 104 when played on mobile device 114. Upon playing application 104 within model 102, emulator 101 utilizes profiler 106 to determine resource utilization of application 104 based upon mobile device characteristics 115.

In one embodiment, emulator 101 is integrated with flash development tool 112 to form an authoring environment 122 that facilitates development and testing of application 104 without the need to continually load application 104 into mobile device 114.

In another embodiment, emulator 101 is an add-in module that may be configured to operate within flash development tool 112.

Mobile device 114 is shown with Flash Player 116, display 118 and input keys 120. In one embodiment, Flash Player 116 is FlashLite™ from Macromedia™ (Adobe Inc). Mobile device 114 may, for example, represent one of: a cell phone, a personal digital assistant (PDA), an interactive home appliances and other such devices. In one example, display 118 represents a color liquid crystal display (LCD) device for displaying text and images to a user of mobile device 114 and input keys 120 represent buttons that allow the user to interact with mobile device 114.

Figure 1B:
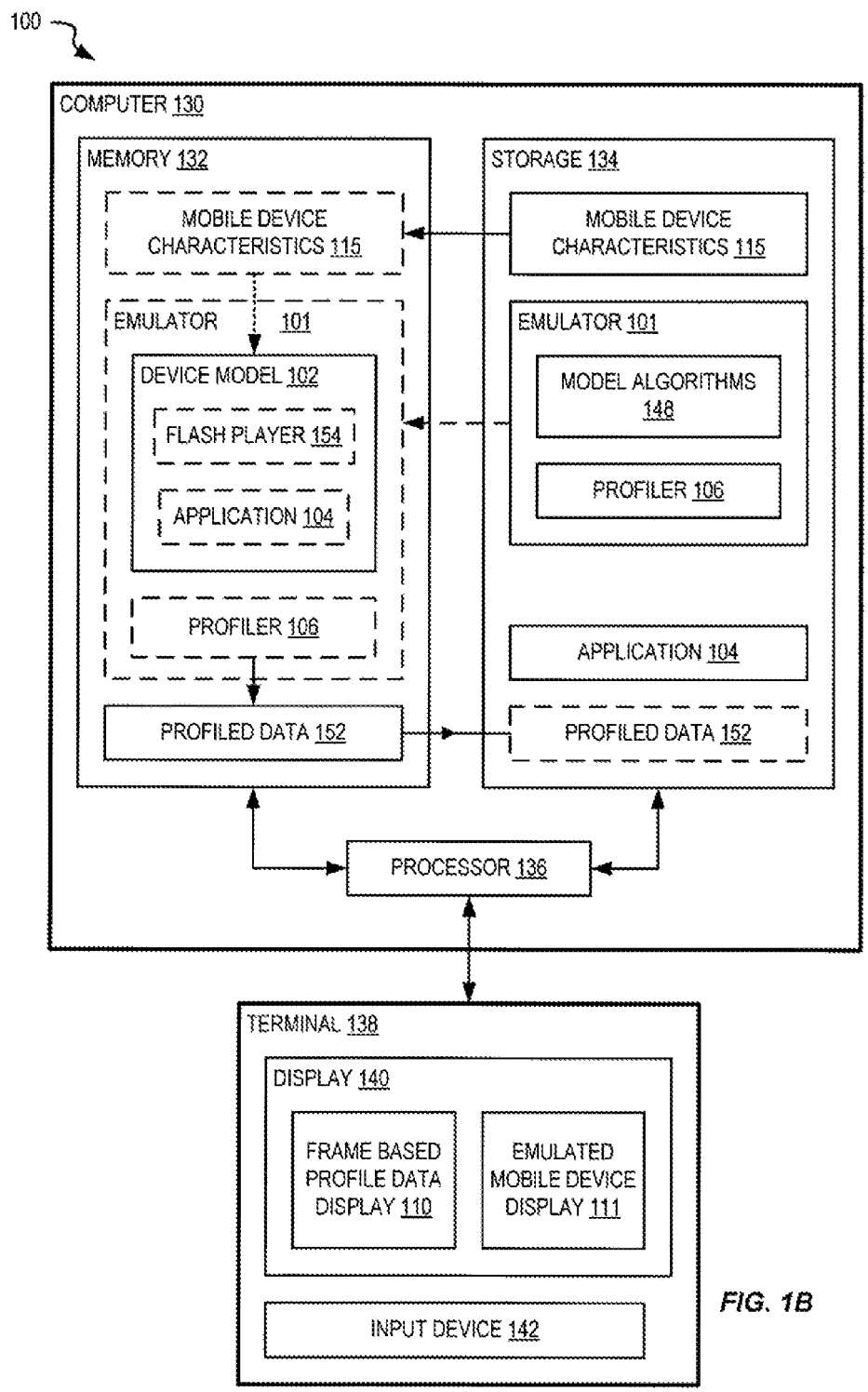
FIG. 1B shows one exemplary embodiment of the system of FIG. 1A within a computer.

FIG. 1B shows one exemplary embodiment of system 100 within a computer 130. Computer 130 includes memory 132, storage 134 and a processor 136. Memory 132 is for example random access memory (RAM) and storage 134 is for example a disk drive or other non-volatile storage media.

Storage 134 is shown with emulator 101, mobile device characteristics 115 and application 104. Storage 134 may also include development tool 112, if desired, for developing application 104. Emulator 101 includes model algorithms 148 and profiler 106. Model algorithms 148 represent one or more algorithms that operate to generate mobile device model 102 to emulate mobile device 114 while executing application 104. Specifically, model algorithms 148 define operation of mobile device 114 based upon mobile device characteristics 115.

TABLE 1

Mobile Device Characteristics

| Parameter | Value |
| --- | --- |
| Name | NOKIA 3650 |
| Processor | ARM 4T |
| Processor Speed | 104 MHz |
| Storage Access Speed | 5.88 files/second |
| RAM Size | 256 MB |
| Storage Size | 512 MB |
| Display Width | 256 |
| Display Height | 394 |
| Pixel Depth | 24 |
| Processor Availability | 60% |
| RAM Availability | 60% |
| Storage Availability | 40% |

Table 1 Mobile Device Characteristics shows exemplary characteristics that may be used to specify performance of model 102 to emulate mobile device 114. For example, in Table 1, the characteristics have the following meaning: 'Processor' specifies the type of the processor in mobile device 114; 'Processor Speed' specifies the clocked speed of the processor within device 114; 'Storage Access Speed' specifies the rate at which data can be moved from storage to memory and/or screen within device 114; 'RAM Size' specifies the size of the RAM in mobile device 114; 'Storage Size' specifies the size of the non-volatile memory in mobile device 114; 'Display Width' specifies the number horizontal pixels on display 118 of device 114; 'Display Height' specifies the number of vertical pixels of display 118; 'Pixel Depth' specifies the number of bits per pixel (e.g., the color depth) of display 118; 'Processor Availability' specifies the percentage of processing resource available for use by applications (e.g., where mobile device 114 represents a cell phone, the phone has to maintain 'phone' operations while running any applications, thus there may only be a portion of the maximum processing resource available to applications); 'RAM Availability' specifies the percentage of RAM available to applications; and 'Storage Availability' specifies the percentage of non-volatile storage space available to applications.

Table 1 may be represented as a data structure (e.g., shown as mobile device characteristics 115 within storage 134) and may be stored in a file (not shown) or a database (not shown) within storage 134, or stored remotely. System 100 may include mobile device characteristics (e.g., mobile device characteristics 115) for multiple devices (e.g., device 114). For example, characteristics 115 may be included for each mobile device type targeted by application 104. A user of system 100 may then select one or more target mobile devices from a list based upon available characteristics 115. As appreciated, additional or fewer characteristics may be included within characteristics 115 to specify performance of mobile device 114 without departing from the scope hereof.

As new mobile device types are created, additional mobile device characteristics 115 may be easily created to specify the performance of the new device types, allowing application development to start before a physical mobile device is available. For example, if a company introduces a new series of six mobile phone handsets, six additional mobile device characteristics 115 may be created based upon measured (e.g., by running benchmarks on the new handsets or prototype) or determined (e.g., by estimating performance based upon previous models) performance thereby allowing emulation and evaluation of applications targeting these new devices.

In one embodiment, mobile device characteristics 115 may be supplied with a device model specific to one mobile device. For example, a manufacturer may supply a combined device model and characteristics for each mobile device 114. Emulator 101 may then utilize the combined device model as device model 102.

In one example, computer 130 may include an interface (not shown) that provides communication with mobile device 114 via one or more of: USB, Ethernet, infra-red, Bluetooth, WiFi and other similar communication media. This interface may, for example, allow application 104 to be deployed on mobile device 114 for final testing of application 104.

In one example of operation, processor 136 loads at least part of emulator 101 into memory 132 for execution. Emulator 101 then generates mobile device model 102, based upon characteristics 115, within memory 132. Emulator 101 then loads and plays application 104 within model 102. Emulator 101 may load all or part of profiler 106 into memory 132 to monitor resources and/or performance of application 104 within model 102. Specifically, as application 104 is played (i.e., utilizing a Flash Player 154) within model 102, profiler 106 monitors and records, as profiled data 152, resources utilized by application 104. Profiled data 152 may be stored (as shown in dashed outline) within storage 134 and/or displayed as frame based profile data 110 on display 140 of terminal 138. In particular, frame based profile data 110 may be used to identify areas within application 104 where upon playing of application 104 within mobile device 114, performance of mobile device 114 would be stressed. Thus, areas where failure may occur within application 104 may be identified prior to running application 104 on mobile device 114. For example, emulator 101 may display all or part of profile data 152 on display 140 to facilitate development of application 104.

Figure 2:
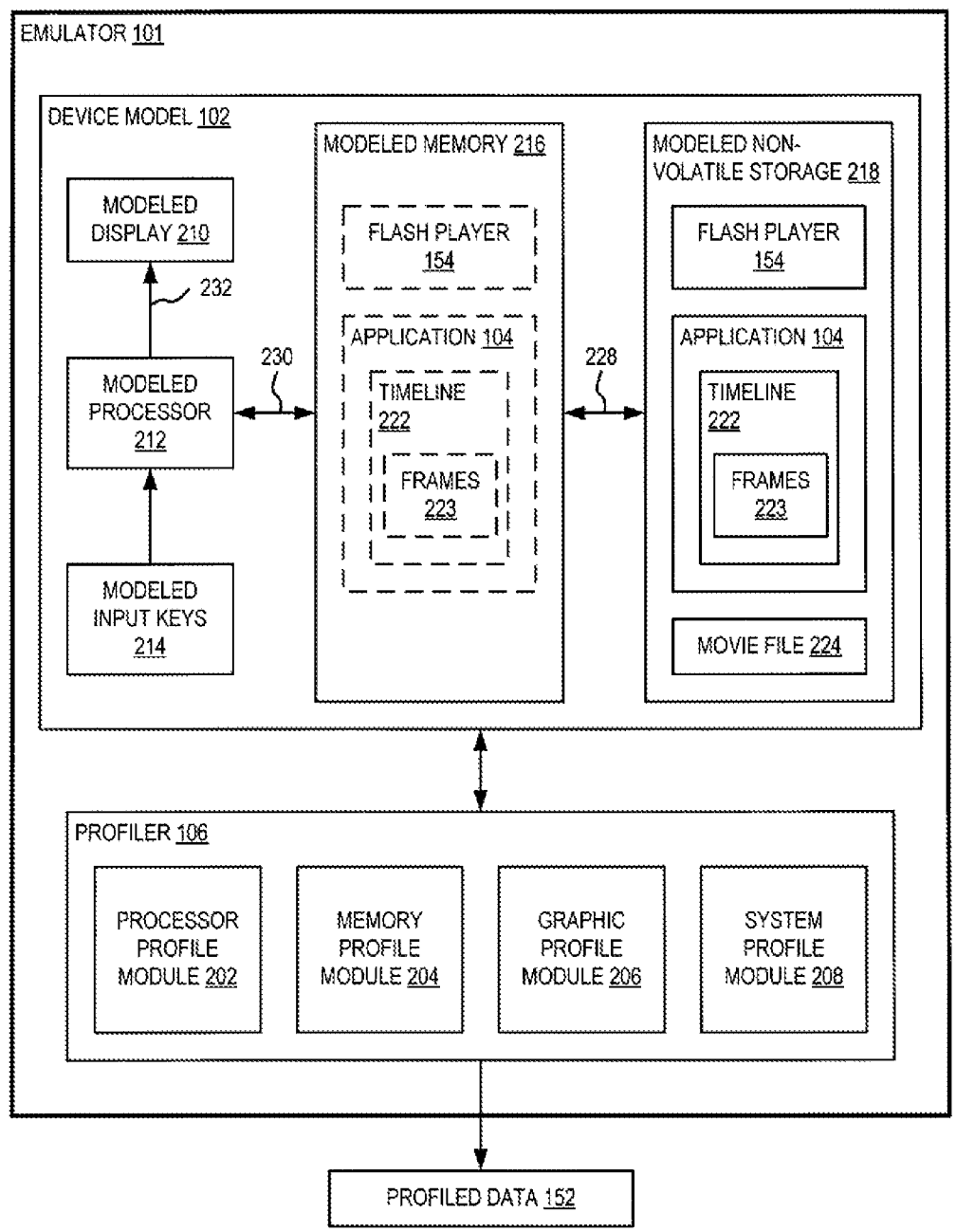
FIG. 2 is a block diagram illustrating detail of an emulator of the system of FIGS. 1A and 1B.

FIG. 2 is a block diagram illustrating emulator 101 of FIGS. 1A and 1B in further detail. In particular, profiler 106, within emulator 101, is shown with a processor profile module 202, a memory profile module 204, a graphic profile module 206 and a system profile module 208. Processor profile module 202 may, for example, estimate processor utilization of application 104 within model 102. Memory profile module 204 may, for example, estimate memory utilization by application 104 within model 102. Graphic profile module 206 may, for example, estimate utilization of 3D fill rate and 3D polygon count of application 104 within model 102. System profile module 208 may, for example, determine overall system utilization of application 104 within model 102. More or fewer profile modules may be included within profiler 106 without departing from the scope hereof.

Device model 102, within emulator 101, has a modeled display 210, a modeled processor 212, modeled input keys 214, modeled memory 216 and modeled non-volatile storage 218. In this example, modeled display 210 represents display 118 of mobile device 114, FIG. 1, processor 212 represents a processor (not shown) of mobile device 114, modeled input keys 214 represent input keys 120 of mobile device 114, modeled memory 216 represents memory (e.g., RAM) of mobile device 114 and modeled non-volatile storage 218 represents non-volatile storage (e.g., flash memory, disk drive storage) of mobile device 114. Fewer or more elements and/or components of mobile device 114 may be modeled within device model 102 without departing from the scope hereof.

Modeled non-volatile storage 218 is shown with Flash Player 154 that may be the same as, or similar to, Flash Player 116, FIG. 1. In one example, Flash Player 154 has similar operation to Flash Player 116, but includes modifications that facilitate monitoring of application 104 within model 102 by profiler 106.

Flash applications are based upon a timeline of frames that may include graphical information and action scripts, FS Commands, network protocols, selected frame rate, etc. Flash Player 116 within mobile device 114 thus operates upon a time line of frames within application 104 to provide graphical displays (e.g., animations, rich media content) upon display 118. Accordingly, profiled data 152 may also be based upon the timeline and frames of application 104 and displayed (e.g., frame based profile data 110) as resource utilization related to one or more of: timeline, frames and processing performance of action scripts.

In FIG. 2, application 104 is shown with a timeline 222 that includes frames 223. Each frame of frames 223 may include graphics and/or action scripts that generate the graphical image for display. For example, an action script may reference one or more graphic files (e.g., movie file 224) to provide graphical images for display 111. Where each frame of frames 223 includes multiple graphic elements and/or action scripts that involve image manipulation (e.g., retrieving data from non-volatile storage, Avatar manipulations, animations, etc.), each frame may require differing resources in order to display correctly. For example, where a frame includes Avatar (e.g., an animated character) manipulation, a certain amount of processor resource is required, whereas a frame that is based upon movie file 224 may simply require data transfer time. If mobile device 114 has insufficient processor resources (e.g., because the animation is too complex for the targeted mobile device), application 104 may crash (i.e., cease to function correctly). Thus, it is important to determine the 'stress' applied by application 104 to resources of mobile device 114.

In one example of operation, Flash Player 154 plays application 104 within model 102. In particular, player 154 processes frames 223 of application 104 based upon ordering of timeline 222. One or more profiler modules 202, 204, 206 and 208 within profiler 106 monitor resource utilization of each frame, storing results as profiled data 152. Profiled data 152 is then displayed as frame based profile data 110 on display 140 for review by the user. Profile data 152 may be displayed in real time as application 104 is played within model 102. Alternatively, the user may scroll through profile data 152 as desired by interacting with data display 110. Alternatively, profile data 152 may be output as a report (not shown). The user interacts with emulated mobile device display 111 to control application 104 as if application were running on device 114.

Figure 3:
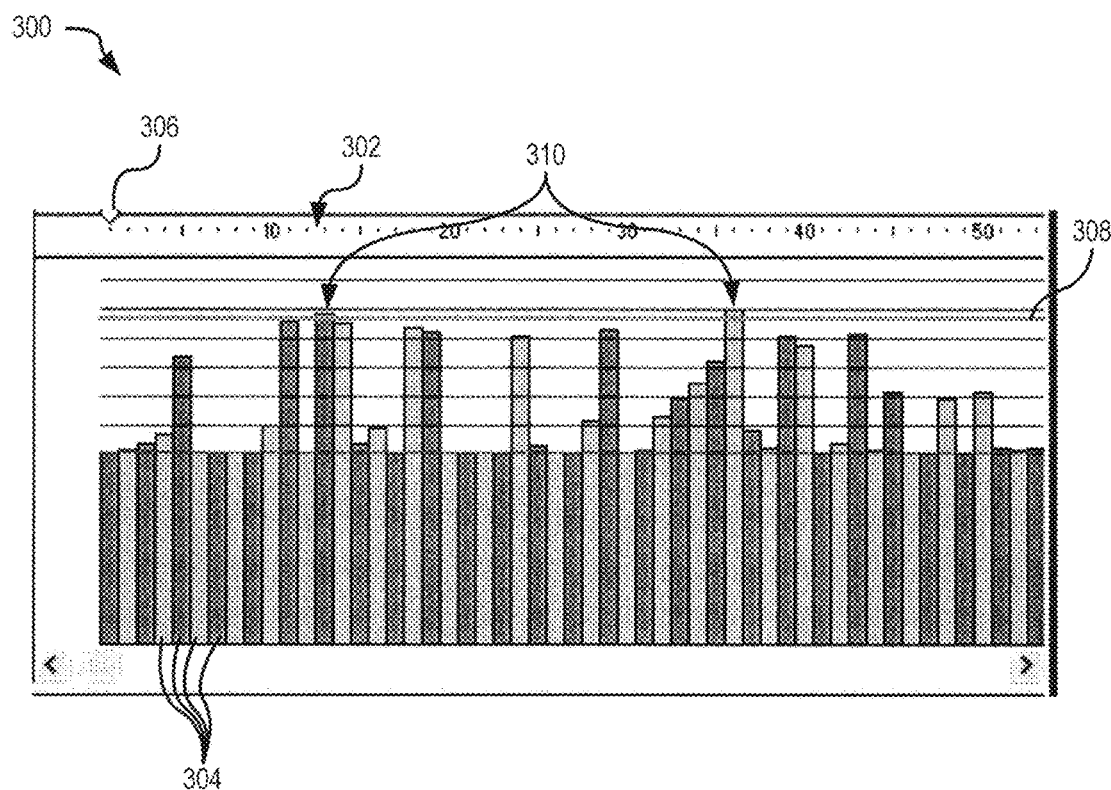
FIG. 3 is a display showing one exemplary frame based profile graph.

FIG. 3 shows one exemplary display 300 showing a frame based display of profiled data 152, FIG. 1A, determined by processor profile module 202. In particular, display 300 is shown with a time line 302 that represents timeline 222 of application 104. In this example, each bar 304 indicates processor resource utilization for certain frames 223 of application 104. During play of application 104 within model 102, a current position indicator 306 shows the frame (i.e., frame 1 in this example) currently displayed by emulated mobile device display 111 (see FIG. 4). A capacity line 308 (capout) indicates the maximum processor resource available to application 128. Where bars 304 rise above capacity line 308 at locations 310, resource utilization for indicated frames of application 104 exceed the available processor resources of mobile device 114; thus application 104 may 'capout' or crash when playing those frames. Display 300 clearly displays processor resource utilization by frame 223 of application 104, thereby facilitating assimilation of stresses applied to mobile device 114 when playing application 104.

Other profile modules 204, 206 and 208, may have similar displays that clearly indicate resource utilization during playing of application 104 within model 102, thereby estimating resource utilization of application 104 when played within mobile device 114.

Figure 4:
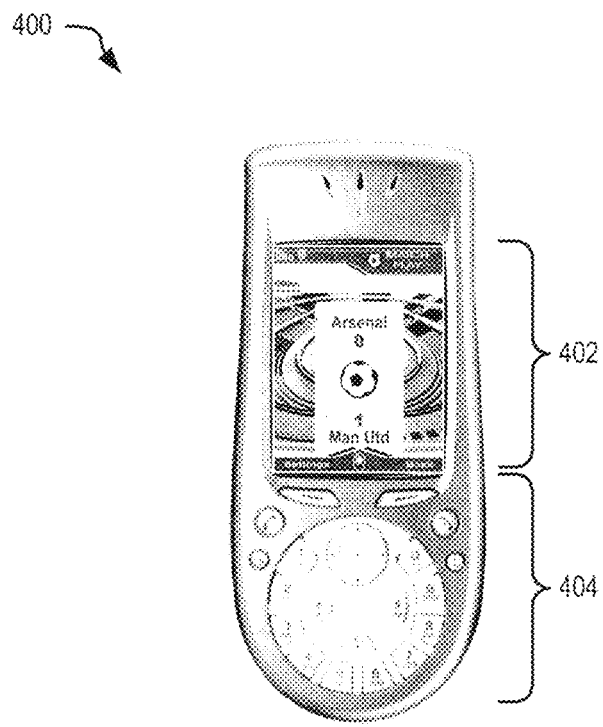
FIG. 4 is a display showing the modeled mobile device of FIGS. 1A and 1B.

FIG. 4 shows one exemplary display 400 generated from device model 132 within emulator 120, FIG. 1. In particular, display 400 shows an image (e.g., generated from a bitmap of mobile device 114) of mobile device 114 with a display area 402 and input keys 404. Display 400 allows the user to see and interact with an application running within device model 132. For example, display area 402 may represent display 118 of mobile device 114 and input keys 404 may represent input keys 120 of mobile device 114.

Figure 5:
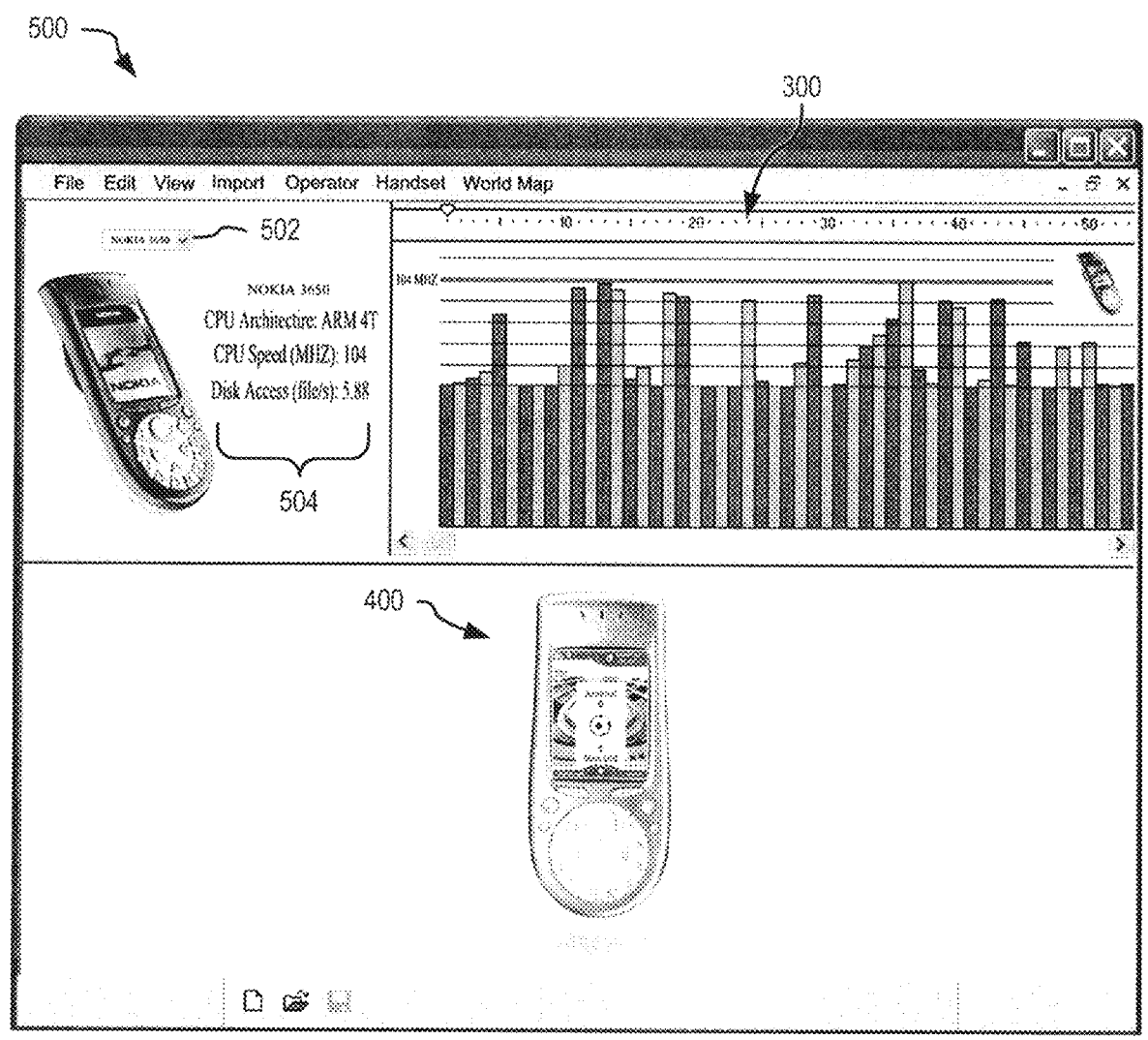
FIG. 5 shows one exemplary window that includes the display of FIG. 3, the display of FIG. 4 and an exemplary user interface.

FIG. 5 shows one exemplary window 500 that includes display 300 of FIG. 3 and display 400 of FIG. 4 and an exemplary user interface. In particular, window 500 shows selection of a mobile device (i.e., NOKIA 3650 in this example) from a pull-down list 502 that results in display of characteristics 504 of the selected mobile device. Characteristics 504 may represent characteristics 115 of FIG. 1A, for example. Window 500 facilitates interaction with model 102 through display 400 and monitoring of resource utilization of application 104 through window 300. Further, pull-down list 502 allows easy selection of further mobile devices upon which application 104 is to be profiled.

Figure 6:
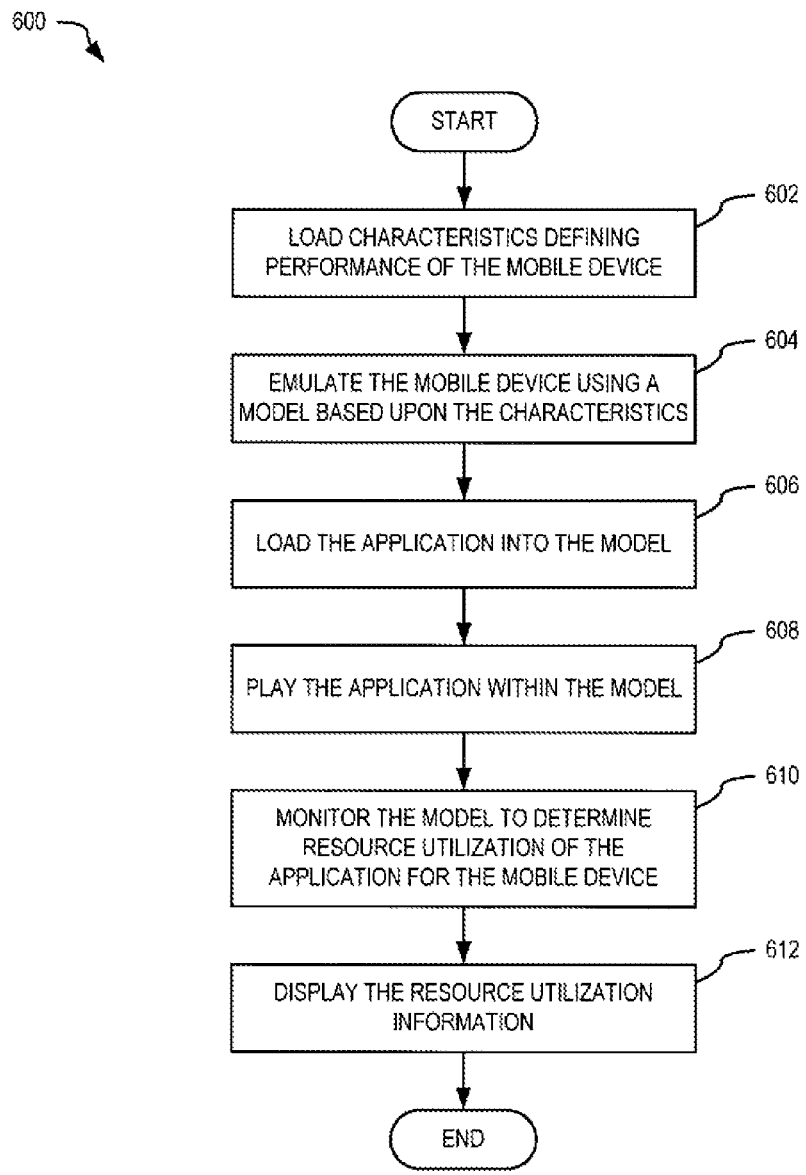
FIG. 6 is a flowchart illustrating a method for modeling and profiling an application to play on a mobile device that includes a Flash Player.

FIG. 6 is a flowchart illustrating a method 600 for modeling and profiling an application playing on a mobile device that includes a Flash Player. Method 600 may, for example, be implemented within emulator 101.

In step 602, method 600 loads characteristics defining performance of the mobile device. In one example of step 602, a user of window 500 selects a mobile device using pull-down list 502 and emulator 101 loads mobile device characteristics 115 into memory 132.

In step 604, method 600 emulates the mobile device using a model based upon the characteristics. In one example of step 604, emulator 101 generates device model 102 based upon mobile device characteristics 115.

In step 606, method 600 loads the application into the model. In one example of step 606, emulator 101 loads application 104 into device model 102.

In step 608, method 600 plays the application within the model. In one example of step 608, emulator 101 plays application 104 within model 102.

In step 610, method 600 monitors the application playing in the model to determine resource utilization of the application for the mobile device. In one example of step 610, emulator 101 utilized profiler 106 to monitor application 104 playing within model 102 to determine profiled data 152.

In step 612, method 600 displays the resource utilization information. In one example of step 612, emulator 101 displays all or part of profiled data 152 as frame based profile data 110 on display 140.

Figure 7:
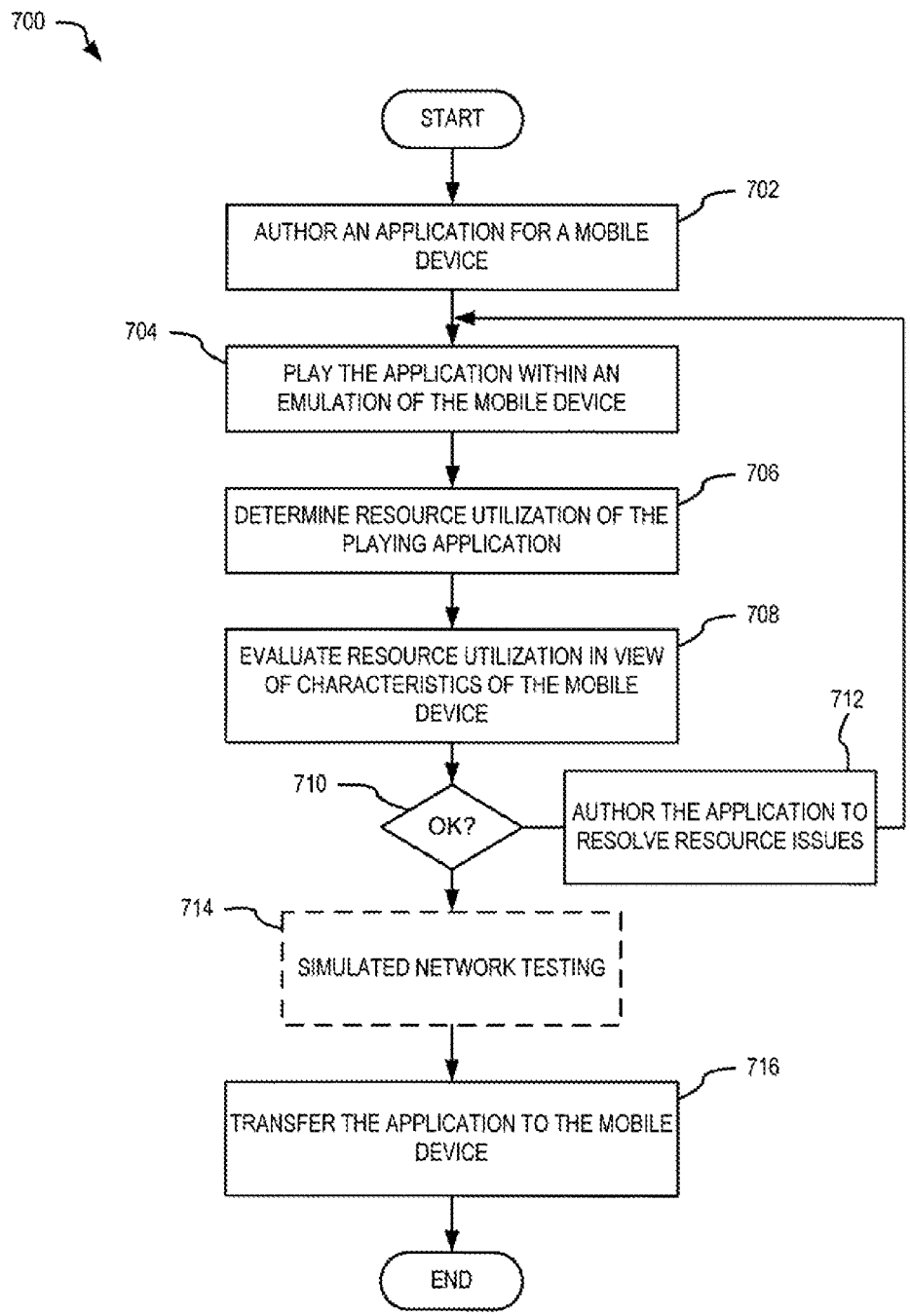
FIG. 7 is a flowchart illustrating one method for authoring, emulating and profiling an application to play on a mobile device that includes a Flash Player.

FIG. 7 is a flowchart illustrating one method 700 for authoring, emulating and profiling an application to play on a mobile device that includes a Flash Player. Method 700 may be implemented within emulator 101, for example.

In step 702, method 700 authors an application for a mobile device. In one example of step 702, a user interacts with frame based application development tool 112 to author application 104.

In step 704, method 700 plays the application within an emulation of the mobile device. In one example of step 704, emulator 101 generates model 102 based upon characteristics 115 of mobile device 114 and then loads and plays application 104 within model 102.

In step 706, method 700 determines resource utilization of the playing application. In one example of step 706, emulator 101 utilizes one or more profile modules 202, 204, 206 and 208 of profiler 106 to determine resource utilization of application 104 within model 102 and stores the resource utilization information as profiled data 152.

In step 708, method 700 evaluates resource utilization in view of characteristics of the mobile device. In one example of step 708, emulator 101 evaluates profiled data 152 to determine, based upon characteristics 115, if resource utilization is within available resources of mobile device 114.

Step 710 is a decision. If in step 710, method 700 determines that the resource utilization of step 708 is within available resources of mobile device 114 (i.e., OK), method 700 continues with step 714; otherwise method 700 continues with step 712.

In step 712, method 700 authors the application to resolve resource issues. In one example of step 712, the user modifies application 104, based upon determined resource utilization of step 708, using development tool 112. Method 700 continues with step 704. Steps 704 through 712 thus repeat until the estimated resources requirement of the application is within available resources of the mobile device.

Step 714 is optional and is particularly suited for testing applications (e.g., application 104) running on a mobile device (e.g., mobile device 114) that is a mobile phone. In step 714, emulator 101 interacts with one or more operator development servers (e.g., operator development server 808, FIG. 8) to configure device model 102 for simulated network operation to allow testing of application 104 within a simulated wireless network environment (e.g., a simulated mobile phone wireless network environment). Simulated network operation is described in further detail below and shown in FIGS. 8 through 13.

In step 716, method 700 transfers the application to the mobile device. In one example of step 716, emulator 101 instructs development tool 112 to publish application 104 to mobile device 114.

Figure 8:
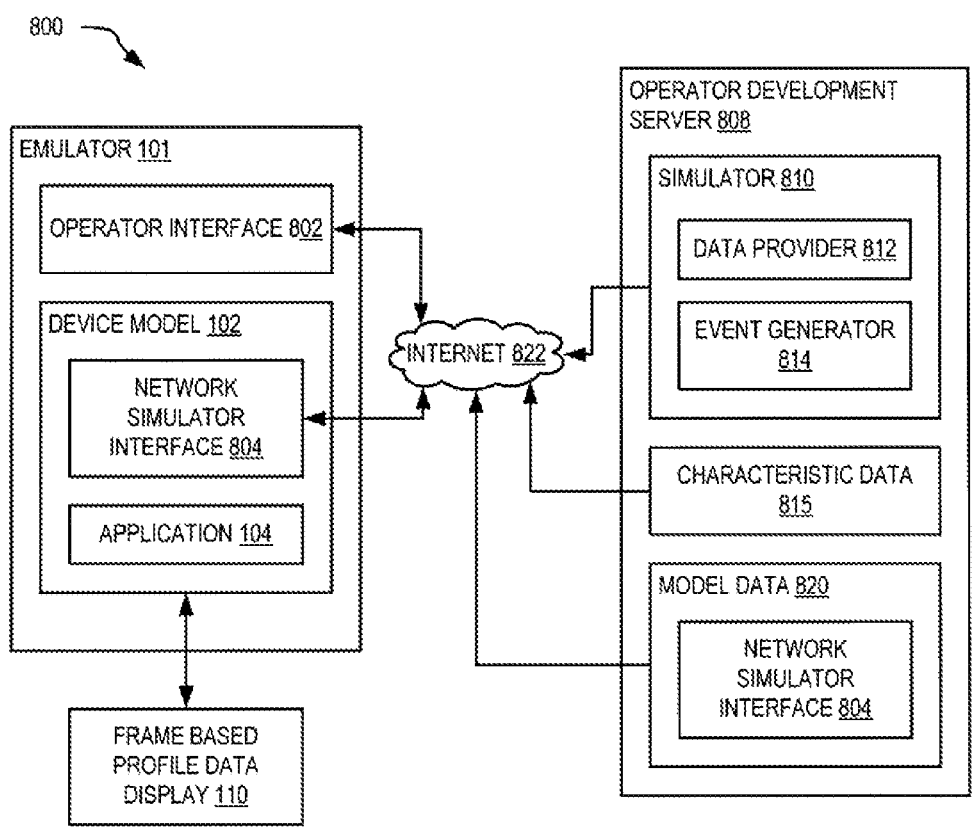
FIG. 8 is a block diagram illustrating the emulator of FIG. 1 interacting with an operator development server via the Internet for simulating playing of the application within a mobile device connected to a wireless network.

FIG. 8 is a block diagram illustrating interaction of emulator 101 with an operator development server 808 via Internet 822 for simulating playing of application 104 within a mobile device connected to a wireless network (e.g., a mobile phone wireless network). FIGS. 9, 10, 11 and 12 show exemplary windows that allow a user to interact with emulator 101 for configuring and testing operation of application 104 within model 102 when simulating connection to a wireless network. FIGS. 8, 9, 10, 11 and 12 are best viewed together with the following description.

Emulator 101 is shown with an operator interface 802 that interacts with operator development server 808 via Internet 822. Internet 822 may, for example, represent the world wide web (WWW), an Intranet or any fixed or wireless server connection. Operator development server 808 is shown with a simulator 810, characteristic data 815 and model data 820. Model data 820 may, for example, represent live network profiles. To facilitate connection to operator development server 808, a user of emulator 101 purchases a subscription from a provider of operator development server 808 (or from a third party) that allows emulator 101 to connect to operator development server 808 via Internet 822. Upon connection to operator development server 808, emulator 101 may download characteristic data 815 from operator development server 808 for one or more mobile device types supported by operator development server 808 (i.e., supported by the operator's wireless network). Characteristic data 815 may, for example, represent mobile device characteristics 115 of FIG. 1. Further, emulator 101 may download additional model data 820 for use within device model 102 for increasing simulated functionality of model 102 (e.g., simulating additional handset functionality and/or network functionality). The user of emulator 101 may, for example, purchase data 820 for additional mobile device types as they become available, thereby allowing emulator 101 to include modeling capability for a new pre-release mobile device, scheduled release mobile device and current mobile devices. Alternatively, the use of data 815 and data 820 may be includes within a monthly subscription fee, thereby allowing the user to author applications for new mobile devices (e.g., new mobile phone models and live mobile profiles) provided by an operator (e.g., mobile phone wireless network operator).

In one example of operation, emulator 101 downloads a network simulator interface 804 from operator development server 808 into device model 102 as shown in FIG. 8. Network simulator interface 804 includes functionality that allows device model 102 to communicate with simulator 810 to simulate connectivity of mobile device 114 with a wireless network. Specifically, network simulator interface 804 within model 102 interacts with data provider 812 and event generator 814 to determine resource utilization resulting from network interaction by model 102. Thus, as application 104 plays within model 102, the effects of device 114 interacting with a wireless network are simulated such that frame based profile data display 110 shows resource utilization that includes the live or scripted effects of interaction with the wireless network. In one embodiment, capacity line 308 of display 300 within profile data display 110 is dynamically modified to show actual resource availability to application 104 resulting from resource utilization by simulated wireless network activity within device model 102. For example, if a message is received and/or retrieved by model 102 while playing application 104, certain resources are required to handle the received message, and therefore available resources for application 104 is reduced accordingly.

Simulator 810 is shown with a data provider 812 and an event generator 814. Data provider 812 may, for example, simulate data transfers within a wireless network. For example, the data transfer may be cased upon a certain bandwidth associated with the wireless network. Event generator 814 may, for example, generate certain events (e.g., incoming calls, incoming text messages, etc) that occur within a wireless network. Simulator 810, using data provider 812 and event generator 814, thus interacts with network simulator interface 804 to model operation of a wireless network (e.g., a mobile phone network).

Operator interface 802 may interact with multiple operator development servers 808 to facilitate testing of application 104 with many operators' networks. As appreciated, where application 104 is designed to function on multiple mobile devices operating on wireless networks worldwide, operator network simulation removes the burden of traveling to operator network locations from application developers, since application operation on a mobile device connected to a network may be simulated by emulator 101 and thus measured back against the authoring environment.

Figure 9:
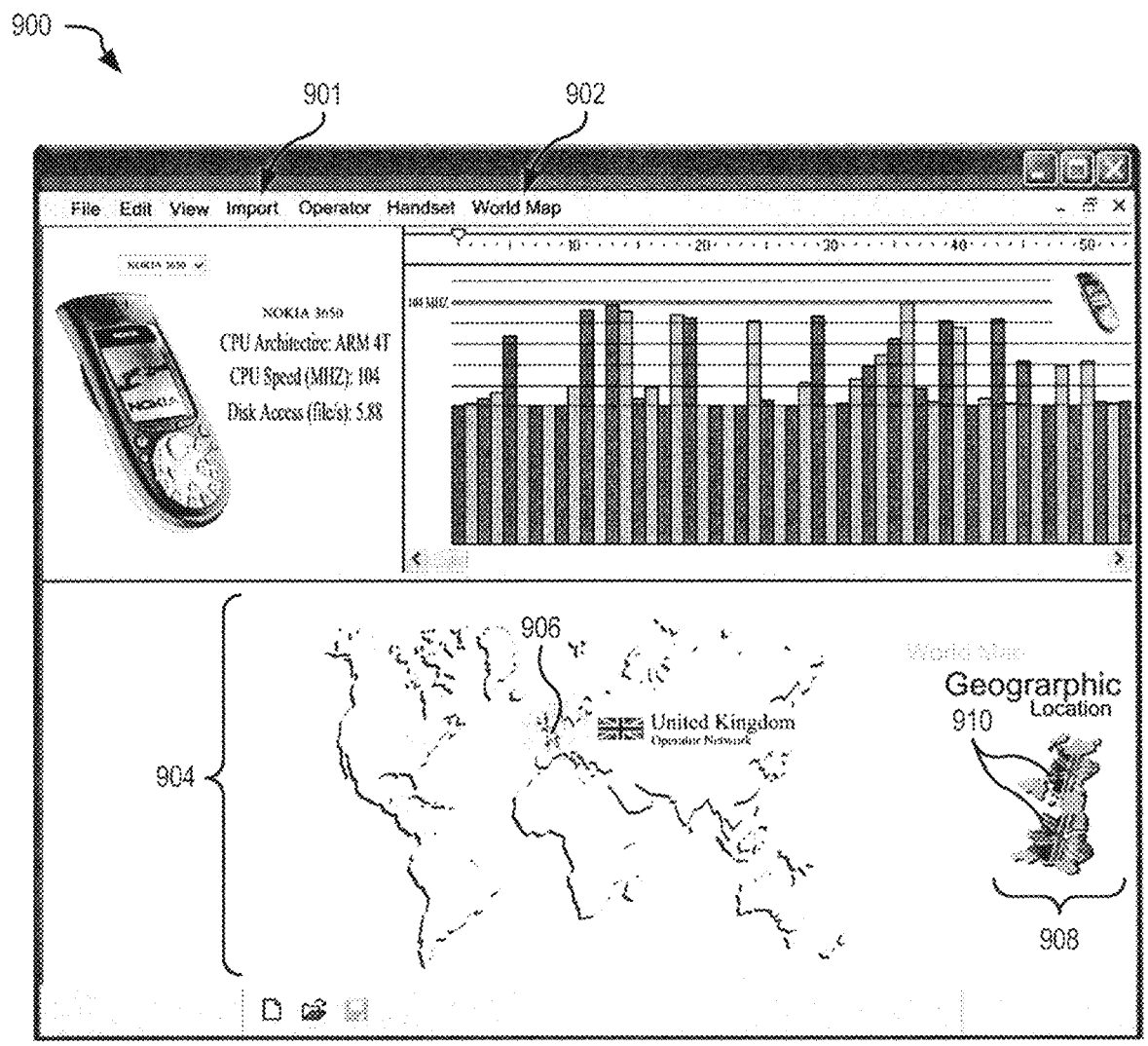
FIGS. 9, 10, 11 and 12 show exemplary user interface screens for interacting with the emulator of FIG. 1 to configure and test operation of the application within the model of the mobile device when connected to a wireless network.

FIG. 9 shows one exemplary window 900 for selecting operator networks based upon geographic location. Window 900 shows a menu item 902 that, upon selection by the user, displays a world map 904 that allows the user to select a geographical region in which mobile device 114 is to operate. For example, window 900 shows a mouse pointer 906 selecting the United Kingdom, resulting in a sub-map display 908 of the selected location showing available wireless networks 910. Sub-map display 908 is, for example a 'mouse-over' event. Upon selection of the location, world map 904 is replaced by sub-map 908 of the selected location and a pull-down list 1004 of available operators within that location as shown in window 1000, FIG. 10. Alternatively, the use may select menu item 1002 to display pull-down list 1004.

Figure 10:
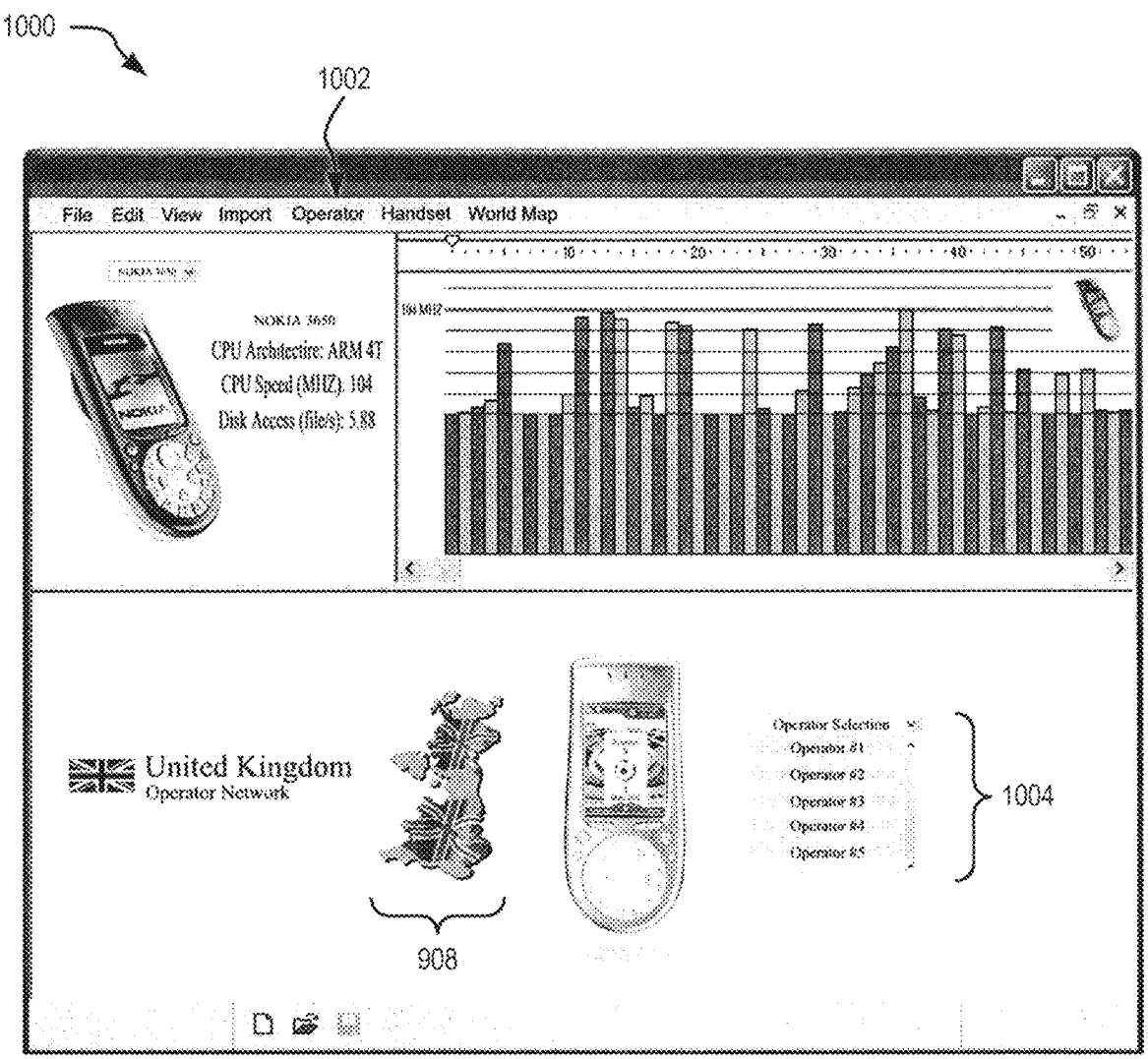
Figure 11:
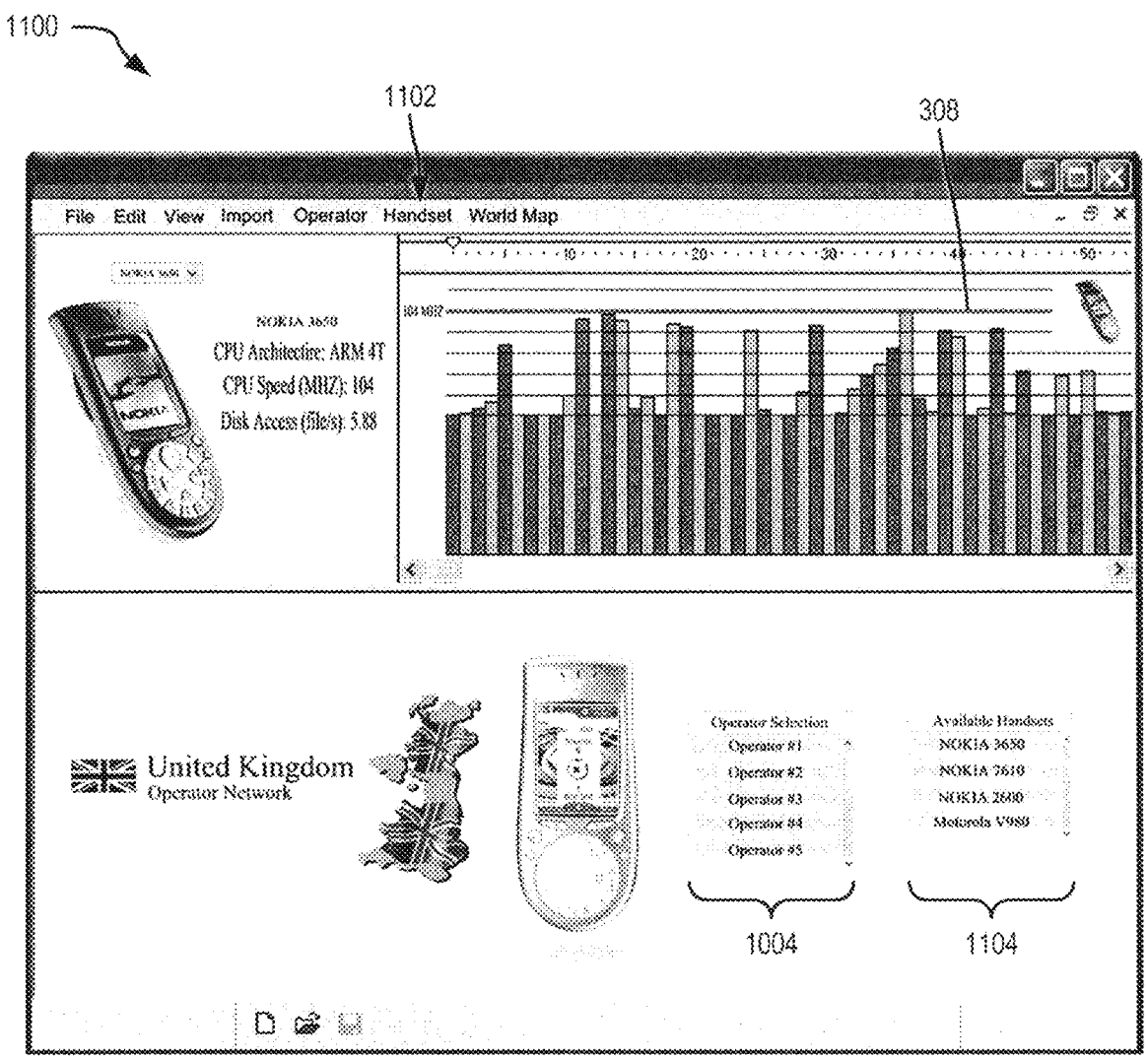
Figure 12:
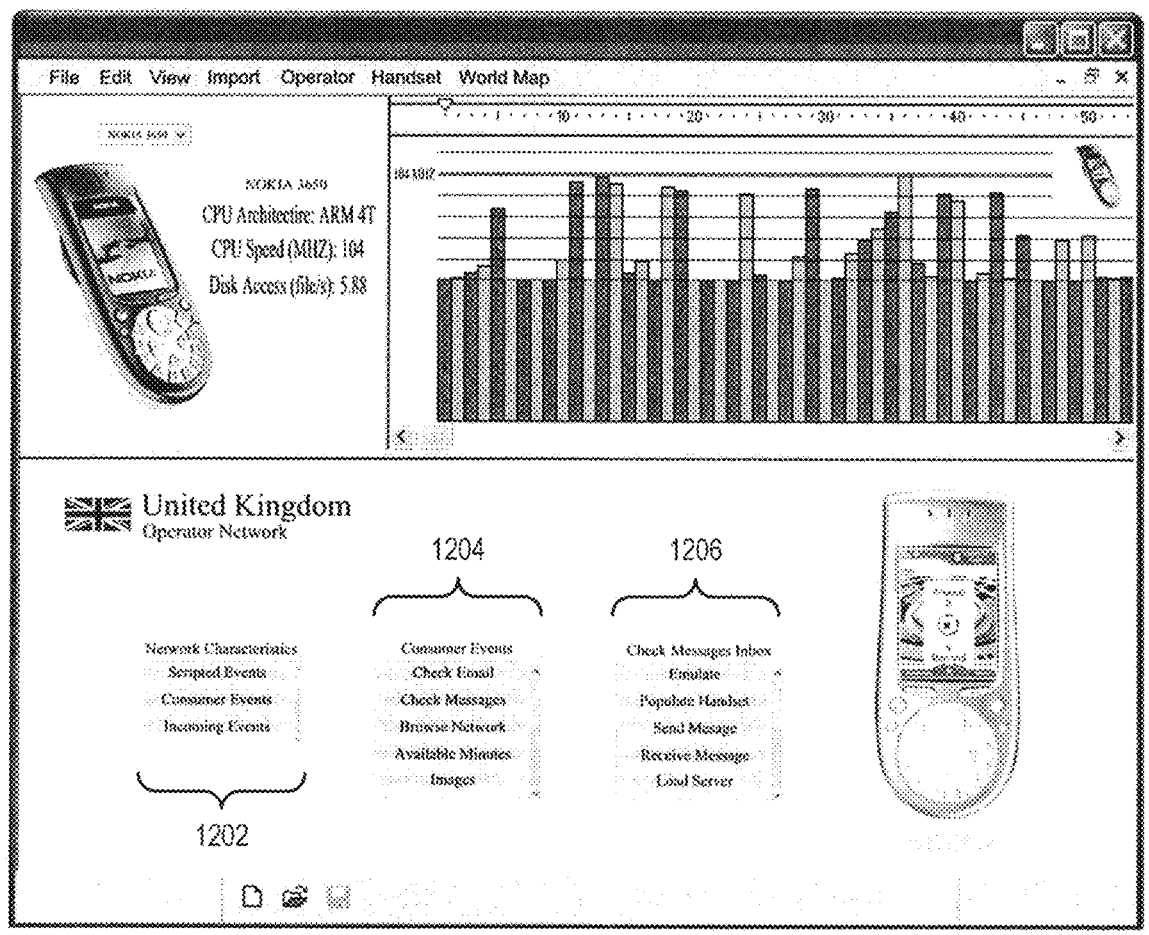

Upon selection of an operator within list 1004, emulator 101 displays a pull-down list 1104 of mobile devices supported by the selected operator, as shown in window 1100 of FIG. 10. Alternatively, the use may select the menu item 1102 to display list 1104. Upon selection of a mobile device from list 1104, window 1200, FIG. 12, is displayed to allow the user to select desired network characteristics for simulation.

Window 1200 shows a pull-down list 1202 of network characteristics that may be simulated by simulator 810. For example, simulator 810 may allow control of scripted events (e.g., cell tower identification, service message, bandwidth, etc.), consumer events (e.g., checking email, checking messages, browsing network, available minutes, selecting images, etc.) and incoming events (e.g., phone calls, WAP Messages, receiving MMS, receiving SMS, etc.). Based upon selection from list 1202, a second list may be presented to allow further simulation requirements to be entered. In the example of window 1200, consumer events entry of list 1202 was selected, resulting in display of pull-down list 1204 from which check messages was selected resulting in the display of pull-down list 1206. In this example, the user may select 'send message' from list 1206 to evaluate the performance of application 104 while a message is received from the network.

In one embodiment, maps 904, 908 and lists 1004, 1104, 1202, 1204 and 1206 are based upon information received by operator interface 802 from one or more operator development servers 808. Thus, functionality of model 102 and selectable simulations of simulator 810 may be easily updated by the operator as new mobile devices are created without requiring updates to software of emulator 101.

Optionally, the user may select menu item 901, FIG. 9, to immediately locate, download and import modeling characteristics into emulator 101. These characteristics may be stored within storage 134 of computer 130, FIG. 1B.

Figure 13:
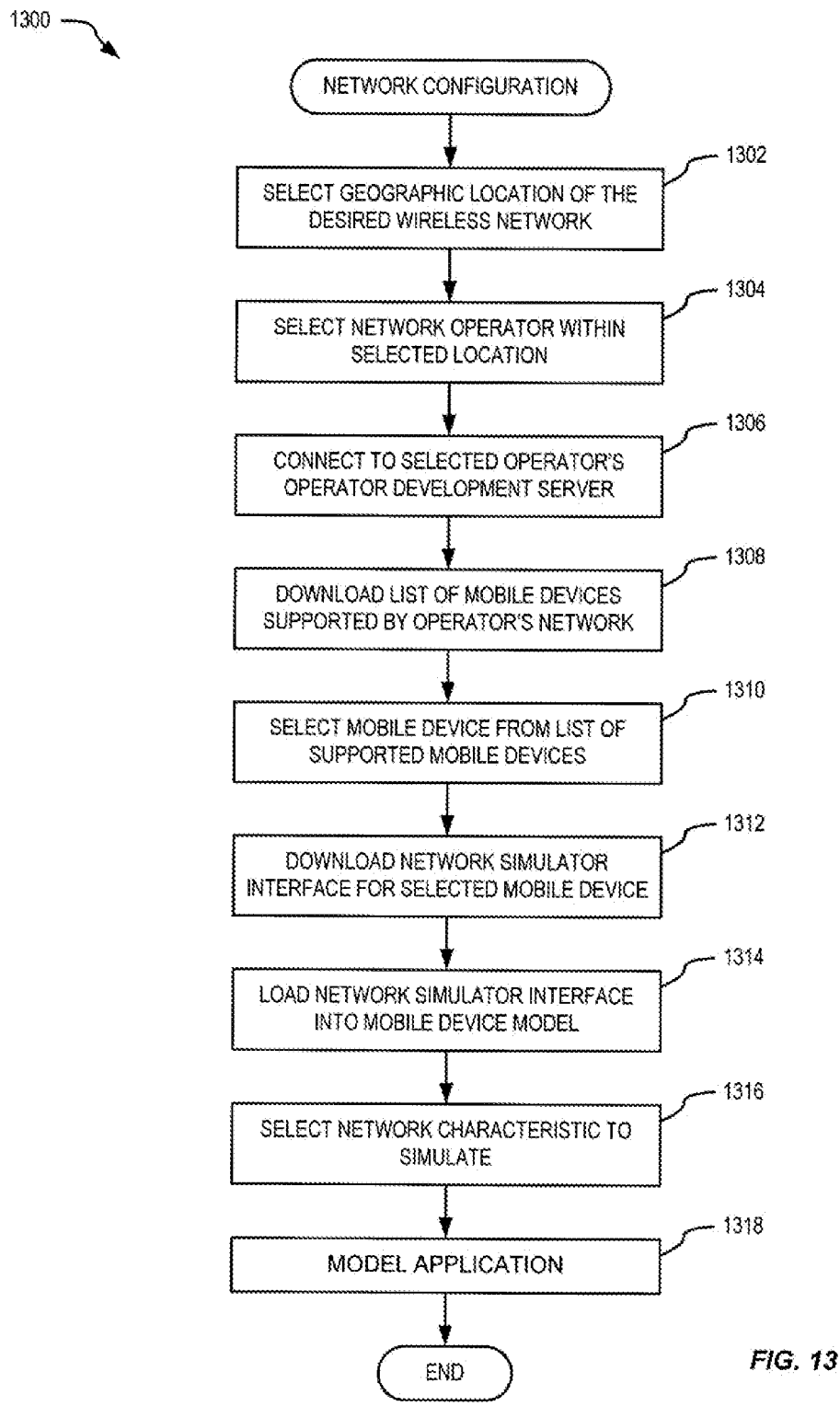
FIG. 13 is a flowchart illustrating one exemplary method for configuring network simulation.

FIG. 13 is a flowchart illustrating one exemplary method 1300 for configuring wireless network simulation.

In step 1302, method 1300 selects a geographic location of the wireless network. In one example of step 1302, emulator 101 displays window 900 and the user selects the United Kingdom as the wireless network location.

In step 1304, method 1300 selects a network operator from within the selected location. In one example of step 1304, emulator 101 displays window 1000 including pull-down list 1004 of network operators within the location selected in step 1302.

In step 1306, method 1300 connects to the selected network operator's development server. In one example of step 1306, emulator 101 utilizes operator interface 802 to connect to operator development server 808 based upon the operator selected in step 1304.

In step 1308, method 1300 downloads a list of mobile devices supported by the simulator of the operator selected in step 1304. In one example of step 1308, emulator 101 downloads characteristic data 815 from server 808 to determine mobile devices supported by simulator 810 and populates list 1104 of window 1100. Of note, an operator may add functionality to simulator 810 based upon a new mobile device prior to supporting the device within the operator's wireless network, thereby encouraging development of applications for the new device before its launch, increasing operator and/or author revenues.

In step 1310, method 1300 selects a mobile device from the list of supported mobile devices. In one example of step 1310, the user selects a mobile device for emulation from list 1104 of window 1100. In another example, where the user has already selected a mobile device from pull-down list 502, emulator 101 automatically selects the same device, if available, from list 1104.

In step 1312, method 1300 downloads a network simulator interface for the selected mobile device. In one example of step 1312, emulator 101 instructs operator interface 802 to download network simulator interface 804 from server 808.

In step 1314, method 1300 loads the network simulator interface into the mobile device model. In one example if step 1314, emulator 101 loads network simulator interface 804 into model 102.

In step 1316, method 1300 selects network characteristics to simulate. In one example of step 1316, the user utilizes lists 1202, 1204 and 1206 of window 1200 to specify network characteristics for simulation by simulator 810.

In step 1318, method 1300 models the application running within a mobile device connected to a wireless network. In one example of step 1318, model 102 interacts with simulator 110 via network simulator interface 804 and internet 822 while playing application 104 and displaying profile data display 110.

In one embodiment, the user may purchase and download simulator 810 from operator development server 808 to facilitate local simulation of the wireless network (i.e., without utilizing Internet 822). In this embodiment, simulator 810 may operate within emulator 101, within authoring environment 122 or within computer 130 to provide interaction with model 102.

Emulator 101 may utilize operator interface 802 to interact with one or more operator development servers 808 to download characteristics (e.g., characteristic data 815) and modeling data (e.g., model data 820) for generating mobile device model 102. As new mobile devices are made available, each application author (i.e., user) is able to download these modeling characteristics and test applications for the new mobile device. As mobile devices become more sophisticated and include additional hardware and functionality, emulator 101, though a subscription service with an operator, for example, may download this additional functionality for use in model 102. These characteristics (e.g., characteristic data 815) may include bitmaps, characteristics handset profiles, modeling algorithms, complete mobile device models, bandwidths etc. thereby automatically updating functionality of authoring environment 122. Wireless network operators participate by updating their development servers (e.g., development servers 808) to provide the latest emulation information and functionality for each supported mobile device (e.g., mobile phone handset) and by updating their network simulators (e.g., simulator 810) to includes functionality and/or proposed functionality of their wireless networks.

Application authors (e.g., users of emulator 101) are provided with a visual authoring environment in which the authored application may be emulated as operating within one or more modeled mobile devices (that are optionally connected to a simulated wireless network) without leaving the authoring environment.

The emulator (e.g., emulator 101) may be provided as part of the authoring environment, or as an add-on to an existing development tool. In an embodiment, characteristics for each mobile device to be emulated are downloaded from a server for a determined price or subscription fee. Since new mobile devices are continually being produced, application authors continually require new modeling characteristics to be able to test their applications. For example, a subscribed charge of $10-15 dollars per handset saves each developer from purchasing a mobile device ($100-200 dollars) and alleviates the need to travel to a wireless network location when testing each mobile device. Thus, the wireless network operator may receive revenue from developers by providing the developers with online network simulation capability. The application authors, via the Internet, are then able to test applications for mobile devices running on wireless networks worldwide.

Characteristics for each mobile device to be emulated may be downloaded from a server for a determined price, licensing or subscription fee. It is estimated that nearly 700 million new mobile devices will be shipped in 2005, with a new handset model being launched every other day. This rapid mobile device development requires that applications designed to run on these mobile devices also sustain rapid development. Development systems targeted at one mobile device may become obsolete and possibly of little value to the developer at the time it is shipped. Since a new mobile device is being launched every other day, application authors continually require purchasing all addressable targeted devices prior to consumer release. For example, a charge of $10-15 dollars per modeled handset would save each developer purchasing each target mobile device ($100-200 dollars) as well as alleviating the need to travel to a wireless network location whilst testing each mobile device before public release, two substantial development and release costs.

During development of an application for a mobile device, an application author may transfer and play the application hundreds of times (development life cycles) on the targeted mobile device before identifying and correcting all system resource problems within the application. Live server and profile updates would substantially reduce and alleviate a high churn rate of development life cycles, enabling a more cost effective authoring model for the developer. As well, although the purchase of a 'static' PC authoring environment may become obsolete due to the ongoing release of new mobile handsets (the target release platform) emulator 101 and operator development server 808 maintains a live and continually updatable business model and authoring platform long after the initial authoring platform has released to the market.

Figure 14:
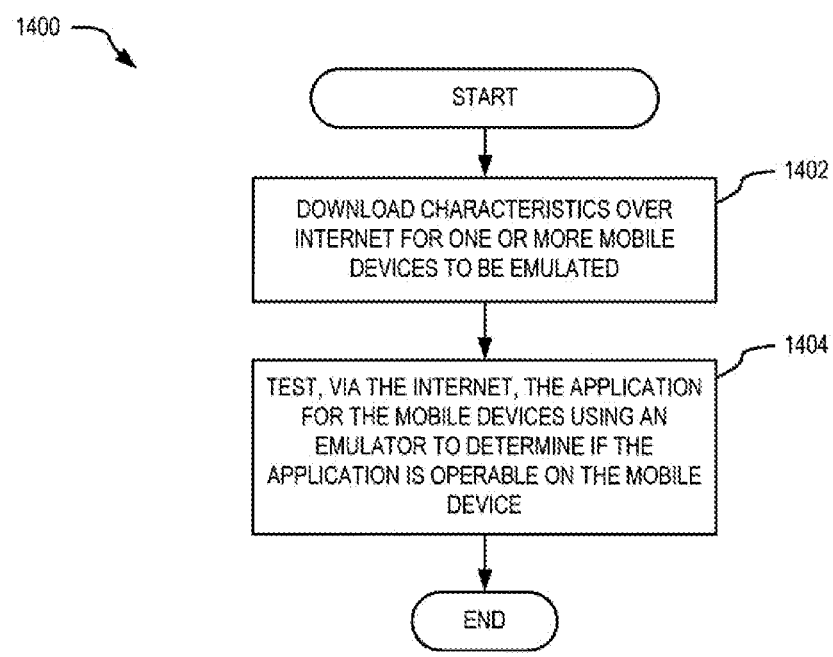
FIG. 14 is a flowchart illustrating one method for determining whether an application of a mobile device is operable.

FIG. 14 is a flowchart illustrating one method for determining whether an application of a mobile device is operable. In step 1402, method 1400 downloads characteristics over Internet for one or more mobile devices to be emulated. In step 1404, method 1400 tests the application for the mobile devices, via the Internet, using an emulator to determine if the application is operable on the mobile device.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A non-transitory, computer-readable medium comprising software instructions for developing a mobile device application, wherein the software instructions, when executed, cause a computer to:
 display at least one of a list of a plurality of mobile device models or operator networks from which a user can select, wherein each mobile device model includes one or more mobile device characteristics and each operator network includes one or more operator network characteristics, each of the mobile device characteristics and the operator network characteristics indicative of performance of one or more areas of code, or functions, or both of the mobile device application;
 simulate at least one of the one or more mobile device characteristics or the operator network characteristics respectively corresponding to the selected mobile device model and the selected operator network;
 monitor utilization of a plurality of resources over time as the one or more areas of code, or functions, or both, of the mobile device application is running;
 display simultaneously two or more graphical representations of the application's resource utilization, wherein each graphical representation relates to a different resource;
 correlate the utilization of a specific displayed resource at a given time with one or more functions of the one or more areas of code, or functions, or both, of the mobile device application responsible for that utilization.

2. The medium of claim 1, wherein the instructions initiate transmission of the one or more areas of code, or functions, or both of the mobile device application that is being developed to a physical version of a mobile device corresponding to the selected mobile device model.

3. The medium of claim 2, wherein the instructions initiate downloading of at least one of the one or more simulated mobile device characteristics or operator network characteristics from a remote server.

4. The medium of claim 2, wherein the one or more mobile device characteristics corresponding to the selected mobile device model include at least one of processor type, processor speed, storage access speed, RAM size, storage size, display width, display height, pixel depth, processor availability, RAM availability or storage availability.

5. The medium of claim 4, wherein the monitored resources include processor usage, RAM usage and network usage.

6. The medium of claim 1, wherein the one or more operator network characteristics are derived at least in part from information captured from one or more wireless networks.

7. The medium of claim 5, wherein the one or more network operator characteristics are based on a geographical region.

8. The medium of claim 5, wherein the instructions simulate one or more network events that occur when interacting with a wireless network.

9. The medium of claim 1, wherein the one or more areas of code, or functions, or both is a modeling algorithm.

10. The medium of claim 1, wherein the one or more operator network characteristics includes at least bandwidth.

11. A non-transitory, computer-readable medium comprising software instructions for developing an application to be run on a mobile device, wherein the software instructions, when executed, cause a computer to:
 display at least one of a list of a plurality of mobile devices or a plurality of operator networks from which a user can target a particular device and a particular operator network;
 model at least one of one or more mobile device characteristics, indicative of the targeted mobile device, or one or more operator device characteristics, indicative of the targeted operator network;
 monitor utilization of a plurality of resources over time as the application is running;
 display simultaneously two or more graphical representations of the application's resource utilization as it is running, wherein each graphical representation relates to a different resource and is synched in time as the application is running;
 identify one or more functions of the application responsible for utilization of a specific displayed resource at a given time.

12. The medium of claim 11, wherein the instructions initiate transmission of the application that is being developed to a physical version of a mobile device corresponding to the targeted mobile device, and initiate downloading of at least one of the one or more modeled characteristics from a remote server.

13. The medium of claim 12, wherein the one or more characteristics indicative of the targeted mobile device include at least one of processor type, processor speed, storage access speed, RAM size, storage size, display width, display height, pixel depth, processor availability, RAM availability or storage availability.

14. The medium of claim 12, wherein the monitored resources include bandwidth.

15. The medium of claim 12, wherein the instructions simulate one or more operator network characteristics, including bandwidth, indicative of the operator network on which the targeted mobile device can operate.

16. The medium of claim 15, wherein the one or more operator network characteristics are derived at least in part from information captured from one or more wireless networks.

17. The medium of claim 15, wherein the instructions simulate one or more network events, including phone calls and SMS messages, that occur when interacting with a wireless network.

18. A non-transitory, computer-readable medium comprising software instructions for developing an application to be run on a mobile device, wherein the software instructions, when executed, cause a computer to:
 display a list of at least one of a plurality of mobile device types or a plurality of operator networks from which a user can select;
 simulate at least one of one or more mobile device characteristics, indicative of the selected mobile device type, or one or more operator network characteristics, indicative of the selected operator network;

initiate downloading of at least one of the one or more mobile device characteristics, indicative of the selected mobile device type, or the one or more operator network characteristics, indicative of the selected operator network, from a remote server;

monitor utilization of a plurality of resources over time as the application is running;

display one or more graphical representations of the application's resource utilization as it is running;

identify one or more areas of code of the application responsible for utilization of a specific displayed resource at a given time.

19. The medium of claim 18, wherein the one or more mobile device characteristics include at least one of processor type, processor speed, storage access speed, RAM size, storage size, display width, display height, pixel depth, processor availability, RAM availability or storage availability.

20. The medium of claim 18, wherein the monitored resources include at least one of bandwidth, processor usage and RAM usage.

21. The medium of claim 20, wherein the instructions initiate transmission of the application that is being developed to a physical version of a mobile device corresponding to the selected mobile device type.

22. The medium of claim 20, wherein the instructions simulate one or more operator network characteristics, including bandwidth, indicative of a network on which the selected mobile device type can operate.

23. The medium of claim 22, wherein the one or more operator network characteristics are derived at least in part from information captured from one or more wireless networks.

24. The medium of claim 22, wherein the one or more operator network characteristics are based on a geographical region.

25. The medium of claim 21, wherein the instructions display simultaneously two or more graphical representations of the application's resource utilization as it is running, wherein each graphical representation relates to a different resource.

26. A non-transitory, computer-readable medium comprising software instructions for developing an application to be run on a mobile device, wherein the software instructions, when executed, cause a computer to:

simulate one or more characteristics indicative of the mobile device, wherein the one or more characteristics indicative of the mobile device include at least one of processor type, processor speed, storage access speed, RAM size, storage size, display width, display height, pixel depth, processor availability, RAM availability or storage availability;

monitor utilization of a plurality of resources over time as the application is running, wherein the monitored resources include processor usage and RAM usage;

display one or more graphical representations of the application's resource utilization;

correspond the utilization of a specific displayed resource at a given time with one or more functions of the application responsible for that utilization;

initiate transmission of the application that is being developed to a physical version of the mobile device.

27. The medium of claim 26, wherein the instructions initiate downloading of at least one of the one or more characteristics indicative of the mobile device from a remote server.

28. The medium of claim 26, wherein the instructions simulate one or more characteristics, including bandwidth, indicative of a network on which the mobile device can operate.

29. The medium of claim 28, wherein the one or more characteristics indicative of a network are derived at least in part from information captured from one or more wireless networks.

30. The medium of claim 28, wherein the instructions simulate one or more network events, including phone calls and SMS messages, that occur when interacting with a wireless network.

31. The medium of claim 28, wherein the one or more characteristics indicative of a network are based on a geographical region.

32. The medium of claim 28, wherein the instructions display simultaneously two or more graphical representations of the application's resource utilization, wherein each graphical representation relates to a different resource and is synched in time as the application is running.

* * * * *